United States Patent
Matsumoto et al.

(10) Patent No.: US 6,788,319 B2
(45) Date of Patent: Sep. 7, 2004

(54) IMAGE DISPLAY APPARATUS, MENU DISPLAY METHOD THEREFOR, IMAGE DISPLAY SYSTEM, AND STORAGE MEDIUM

(75) Inventors: Yuichi Matsumoto, Kanagawa (JP); Shigeki Mori, Saitama (JP)

(73) Assignee: Canon Kabushiki Kaisha (JP)

( * ) Notice: Subject to any disclaimer, the term of this patent is extended or adjusted under 35 U.S.C. 154(b) by 312 days.

(21) Appl. No.: 09/882,879

(22) Filed: Jun. 15, 2001

(65) Prior Publication Data

US 2002/0047866 A1 Apr. 25, 2002

(30) Foreign Application Priority Data

Jun. 15, 2000 (JP) .......................................... 2000-179858

(51) Int. Cl.$^7$ ................................................ G09G 5/00
(52) U.S. Cl. .................. 345/841; 345/801; 345/810; 345/815; 345/817; 345/818; 345/853
(58) Field of Search ................................ 345/810, 841, 345/811, 813, 815, 816, 817, 818, 819, 820, 821, 825, 826, 801, 853, 807

(56) References Cited

U.S. PATENT DOCUMENTS

| | | | | |
|---|---|---|---|---|
| 4,843,538 A | * | 6/1989 | Lane et al. | 700/83 |
| 5,689,668 A | * | 11/1997 | Beaudet et al. | 345/841 |
| 5,745,096 A | * | 4/1998 | Ludolph et al. | 345/764 |
| 5,751,373 A | * | 5/1998 | Ohyama et al. | 725/59 |
| 5,826,257 A | * | 10/1998 | Snelling, Jr. | 707/4 |
| 6,133,911 A | * | 10/2000 | Kim | 345/719 |
| 6,292,174 B1 | * | 9/2001 | Mallett et al. | 345/163 |
| 6,603,493 B1 | * | 8/2003 | Lovell et al. | 345/800 |
| 6,661,437 B1 | * | 12/2003 | Miller et al. | 345/810 |

* cited by examiner

Primary Examiner—John Cabeca
Assistant Examiner—Cuong T. Thai
(74) Attorney, Agent, or Firm—Rossi & Associates

(57) ABSTRACT

There are provided an image display apparatus and method which are always capable of displaying the whole of menus at a plurality of hierarchical levels and realize a user-friendly interface, a menu display system including at least one menu display apparatus of the above type, and a computer-readable storage medium storing a program for executing the menu display method.

22 Claims, 37 Drawing Sheets

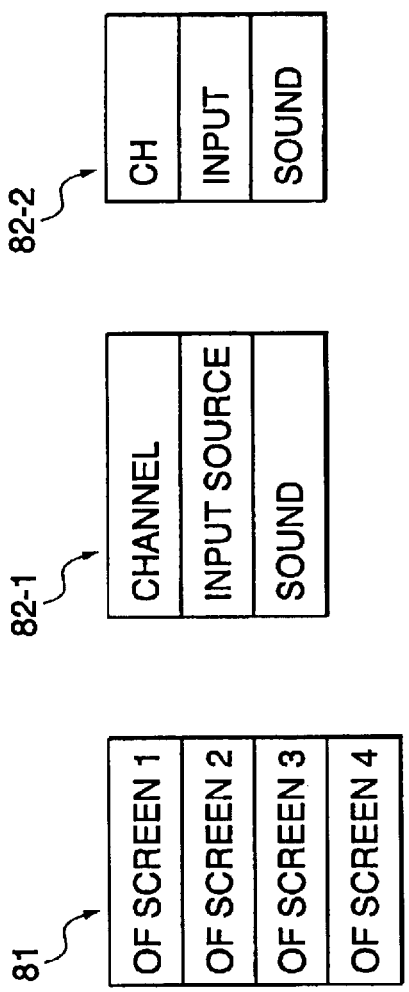
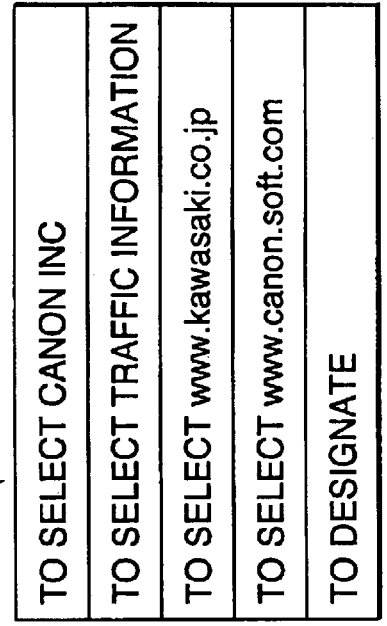

FIG. 13

| MENU ID | INDIVIDUAL ID | PRECEDING PARTICLE CONTROL INFORMATION | COMMAND STATEMENT PHRASE BODY | COMMAND STATEMENT PARTICLE | COMMAND CODE | NEXT CONNECTOR INFORMATION |
|---|---|---|---|---|---|---|
| RT001 | 001 | | THIS SCREEN | OF | THSWIN,NEXTMN | GN001,NW001 |

FIG. 14

| MENU ID | INDIVIDUAL ID | PRECEDING PARTICLE CONTROL INFORMATION | COMMAND STATEMENT PHRASE BODY | COMMAND STATEMENT PARTICLE | COMMAND CODE | NEXT CONNECTOR INFORMATION |
|---|---|---|---|---|---|---|
| GN001 | 001 | | CHANNEL | | WINCHE | CH001 |
| ↑ | 002 | | INPUT SOURCE | | WINSRC | SR001 |
| ↑ | 003 | | TONE | | SNDVOL | VL001 |
| ↑ | 004 | | SOUND | | SNDSRD | SU001 |
| ↑ | 005 | | VOICE | | SNDBIL | BI001 |
| ↑ | 006 | | PROGRAM INFORMATION SCREEN | | DATWIN | DA001 |
| ↑ | 007 | OF→ON | SYSTEM INFORMATION | | SYSINF | SY001 |
| ↑ | 008 | | SCREEN SETTING | | WINSET | ST001 |
| ↑ | 999 | | <CANCEL> | | | CANCEL |

FIG. 15

| MENU ID | INDIVIDUAL ID | PRECEDING PARTICLE CONTROL INFORMATION | COMMAND STATEMENT PHRASE BODY | COMMAND STATEMENT PARTICLE | COMMAND CODE | NEXT CONNECTOR INFORMATION |
|---|---|---|---|---|---|---|
| NW001 | 001 | OF→TO | NEW SCREEN | IS ADDED | WINNEW | COMPLETION, RT002 |

FIG. 16

| MENU ID | INDIVIDUAL ID | PRECEDING PARTICLE CONTROL INFORMATION | COMMAND STATEMENT PHRASE BODY | COMMAND STATEMENT PARTICLE | COMMAND CODE | NEXT CONNECTOR INFORMATION |
|---|---|---|---|---|---|---|
| RT002 | 001 | | THIS SCREEN | OF | THSWIN, NEXTMIN | GN001, NW001, WG001 |

FIG. 17

| MENU ID | INDIVIDUAL ID | PRECEDING PARTICLE CONTROL INFORMATION | COMMAND STATEMENT PHRASE BODY | COMMAND STATEMENT PARTICLE | COMMAND CODE | NEXT CONNECTOR INFORMATION |
|---|---|---|---|---|---|---|
| WG001 | 001 | | POSITION | | WINPOS | PS001 |
| ↑ | 002 | | SIZE | | WINSEZ | SI001 |
| ↑ | 003 | OF→ | DELETED | IS | DELETE | COMPLETION |
| ↑ | 999 | | <CANCEL> | | | CANCEL |

FIG. 18

| MENU ID | INDIVIDUAL ID | PRECEDING PARTICLE CONTROL INFORMATION | COMMAND STATEMENT PHRASE BODY | COMMAND STATEMENT PARTICLE | COMMAND CODE | NEXT CONNECTOR INFORMATION |
|---|---|---|---|---|---|---|
| CH001 | 001 | | SWITCHED TO PRECEDING CH | IS | CHANDN | COMPLETION |
| ↑ | 002 | | SWITCHED TO NEXT CH | IS | CHANUP | COMPLETION |
| ↑ | 003 | | INPUT VIA 10 KEY | IS | CHATEN | COMPLETION |
| ↑ | 004 | | INPUT BY EPG | IS | CHAEPG | COMPLETION |
| ↑ | 999 | | <CANCEL> | | | CANCEL |

FIG. 19

| MENU ID | INDIVIDUAL ID | PRECEDING PARTICLE CONTROL INFORMATION | COMMAND STATEMENT PHRASE BODY | COMMAND STATEMENT PARTICLE | COMMAND CODE | NEXT CONNECTOR INFORMATION |
|---|---|---|---|---|---|---|
| RT003 | 001 | | THIS SCREEN | OF | THSWIN,NEXTMN | GN001,WG001 |

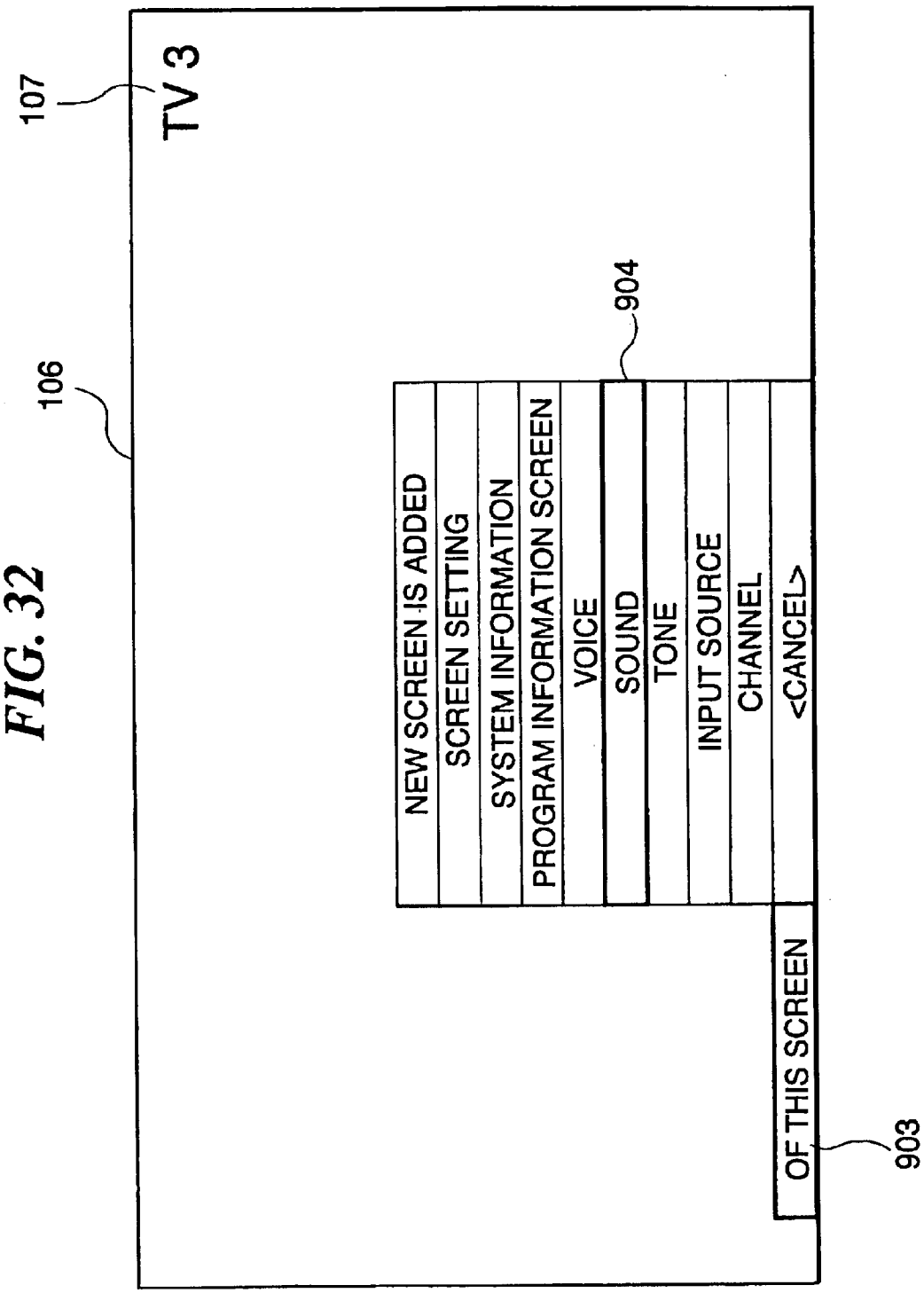

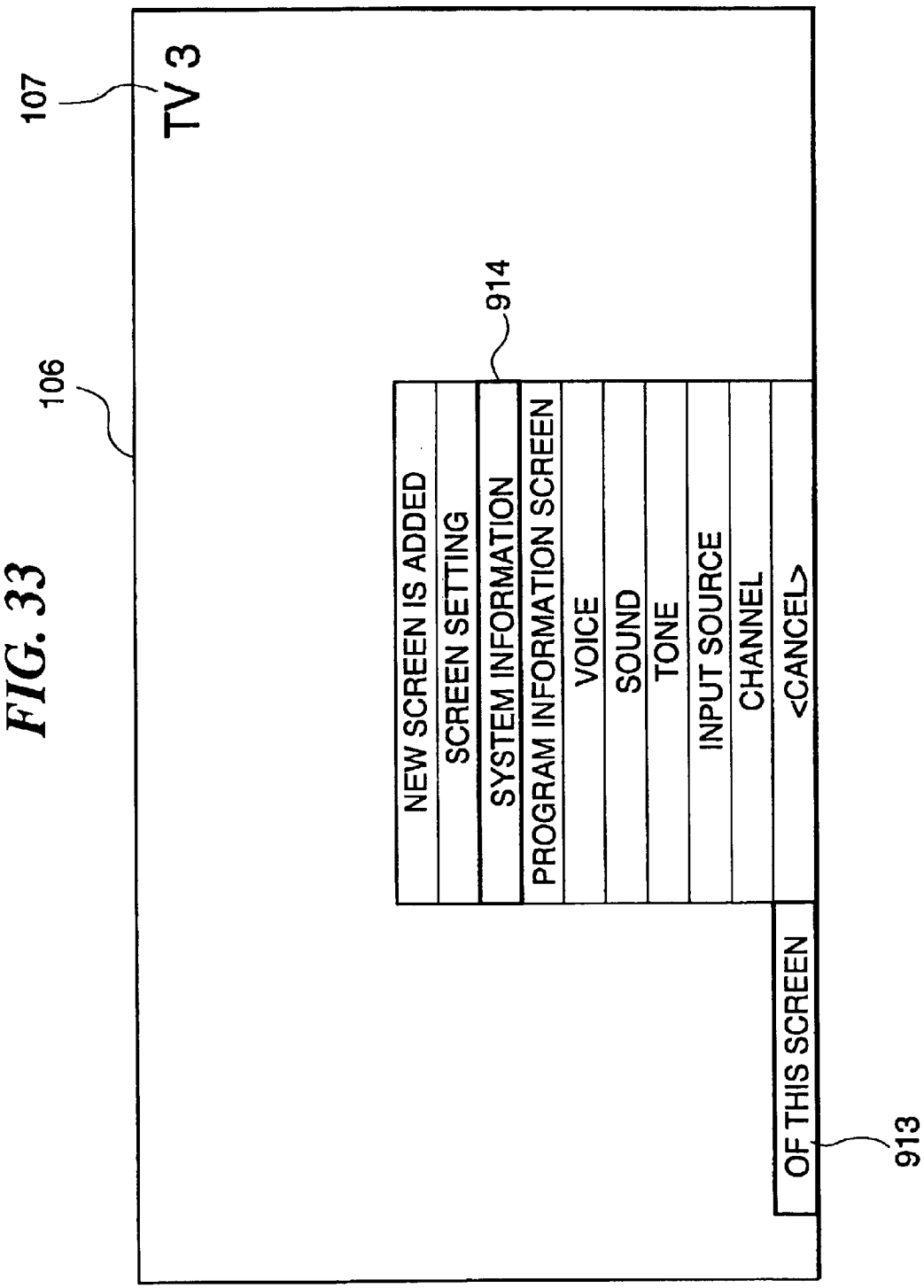

FIG. 34

| MENU ID | INDIVIDUAL ID | SYN-THESIS MENU ID | PRECEDING PARTICLE CONTROL INFORMATION | COMMAND STATEMENT PHRASE BODY | COMMAND STATEMENT PARTICLE | COMMAND CODE | NEXT CONNECTOR INFORMATION |
|---|---|---|---|---|---|---|---|
| GN001 | 001 | 001 | | CHANNEL | | WINCHE | CH001 |
| ↑ | 002 | 002 | | INPUT SOURCE | | WINSRC | SR001 |
| ↑ | 003 | 003 | | TONE | | SNDVOL | VL001 |
| ↑ | 004 | 004 | | SOUND | | SNDSRD | SU001 |
| ↑ | 005 | 005 | | VOICE | | SNDBIL | BI001 |
| ↑ | 006 | 006 | | PROGRAM INFORMATION SCREEN | | DATWIN | DA001 |
| ↑ | 007 | 007 | OF→ON | SYSTEM INFORMATION | | SYSINF | SY001 |
| ↑ | 008 | 008 | | SCREEN SETTING | | WINSET | ST001 |
| NW001 | 001 | 009 | OF→TO | NEW SCREEN | IS ADDED | WINNEW | COMPLETION, RT002 |
| GN001 | 999 | 999 | | <CANCEL> | | | CANCEL |

FIG. 35

THSWIN(WIN00) [RT001], WINCHE[GN001+NW001], CHANDN[CH001]

FIG. 36

| MENU ID | INDI-VIDUAL ID | PRECEDING PARTICLE CONTROL INFORMATION | COMMAND STATEMENT PHRASE BODY | COMMAND STATEMENT PARTICLE | COMMAND CODE | NEXT CONNECTOR INFORMATION |
|---|---|---|---|---|---|---|
| GN001 | 001 | | CHANNEL | | WINCHE | CH001 |
| ↑ | 002 | | INPUT SOURCE | | WINSRC | SR001 |
| ↑ | 003 | | TONE | | SNDVOL | VL001 |
| ↑ | 004 | | SOUND | | SNDSRD | SU001 |
| ↑ | 005 | | VOICE | | SNDBIL | BI001 |
| ↑ | 006 | | PROGRAM INFORMATION SCREEN | | DATWIN | DA001 |
| ↑ | 007 | OF→ON | SYSTEM INFORMATION | | SYSINF | SY001 |
| ↑ | 008 | OF→ON | SCREEN SETTING | | WINSET | ST001 |
| ↑ | 009 | | VIEW NEWS | | WINSRC[GN001+NW001],GRNWAV[SR001], WINCHE[GN002],CHATEN(CH1)[CH001] | COMPLETION |
| ↑ | 999 | | <CANCEL> | | | CANCEL |

Prior Art

Prior Art

IMAGE DISPLAY APPARATUS, MENU DISPLAY METHOD THEREFOR, IMAGE DISPLAY SYSTEM, AND STORAGE MEDIUM

BACKGROUND OF THE INVENTION

1. Field of the Invention

This invention relates to an image display apparatus for displaying menu images used for control of the apparatus itself, a menu display method therefor, an image display system, and a storage medium storing a program for executing the menu display method.

2. Prior Art

Conventionally, it is a generally known method to use a pull-down menu or a popup menu when a user gives instructions concerning changes of a channel, a sound, an input source, and the like, to an image display apparatus, such as a multi-screen television receiver.

FIGS. 37A and 37B illustrate an example of a method of this kind. When the user desires to change an input source of a display screen shown in FIG. 37A, first, he operates a menu key, and calls an operation menu 951 at a first hierarchical level, as shown in FIG. 37B. Here, the user employs an up arrow key and a down arrow key as dedicated keys to select a desired option (SCREEN 3, in this example) and operate a determination key. In response to the operation, an operation menu 952 at a second hierarchical level is displayed, and the user selects an option "INPUT SOUCE", for instance. Then, similarly, operation menus 953 and 954 at third and fourth hierarchical levels are displayed sequentially, for instance, and the user selects and determines options "IS SWITCHED TO INTERNET" and "TO SELECT CANON INC", whereby the input source is changed.

At this time, when the user views a television program by using a television receiver, or enjoys a movie or the like reproduced by a video cassette recorder, the user normally views the same at a certain distance from the body of the television receiver. Therefore, generally, large font characters are used to display operation menus so as to allow the user to view and understand details of the menu easily.

Also, conventionally, the operation or function of DTV (Digital Television) equipment is controlled in various ways. For instance, there have been proposed, Method (1) in which similarly to conventional TV devices, as shown in FIG. 38, a remote controller is provided with keypad buttons corresponding to the respective functions of the DTV device, Method (2) in which pointing devices or keypad buttons for moving a cursor are employed, and as shown in FIG. 39, options are sequentially selected from a multistage hierarchical menu for finally selecting a desired final function, Method (3) in which a function is selected by using a plurality of tabs, as shown in FIG. 40, for making various settings of a computer and options shown together with descriptions on respective function-configuration screens under the tabs.

However, the above conventional examples suffer from the following problems:

(1) Recent digitalization of a television receiver has led to an increased number of functions of the receiver, which in turn leads to increased numbers of hierarchies of the menu and menu options. In accordance with such an increase in the number of functions of the television receiver, it is required to display menu options in more detail so as to permit even a beginner to understand the contents of the menu with ease, which results in an increase in the contents and the number of characters of each menu option. Under these circumstances, it is sometimes impossible for the conventional operation menu system to display all the operation menus to be displayed on the screen of a television receiver.

To overcome such problems, it is contemplated that as shown in FIG. 37B, when a menu at a lower level in hierarchy cannot be displayed on the screen, the menu at the lower level is superimposed on a menu at a higher level in hierarchy which is already displayed. In this case, the menu positioned at the higher level in hierarchy is deleted, and it becomes impossible for the user to view all the menus on the screen. This makes it difficult to confirm menu options displayed at the lowest level in hierarchy at the this time. Further, if the user recognizes that a selected menu option is not a desired one, it is difficult to determine to which hierarchical level he should return.

(2) In controlling a DTV device, if Method (1) is employed which provides a remote controller with the FIG. 38 keypad buttons corresponding to the functions of the DTV device, the keypad buttons are increased in number, which tends to bring about erroneous depression of the keypad buttons, and further makes it impossible to perform comfortable operation of the remote controller while viewing the screen of the DTV device, since it is required to watch a remote controller on hand, when a keypad button corresponding to a desired function is looked for.

Further, if Method (2) is employed which causes the user to select a desired function from the multistage menu shown in FIG. 39, as the hierarchy of the menu becomes deeper or increased, the number of menus displayed on the screen becomes extremely larger. At the same time, since menu options as to other functions continue to be displayed in intermediate stages of the selection operation, the menus are displayed in a confusing manner, so that the operator is liable to forget his original intention or object while shifting from one hierarchical menu to another to search for the object. Further, in Method (3) which employs a configuration screen having a plurality of tabs as shown in FIG. 40, there is no menu list provided, and hence it takes time to find the item if it is not clear under which tab is provided a function setting option desired by the user.

SUMMARY OF THE INVENTION

It is an object of the invention to provide an image display apparatus and method which are always capable of displaying the whole of menus at a plurality of hierarchical levels and realize a user-friendly interface, a menu display system including at least one menu display apparatus of the above type, and a storage medium storing a program for executing the menu display method.

To attain the above object, according to a first aspect of the invention, there is provided an image display apparatus having menus of a plurality of hierarchical levels, the image display apparatus including menu display means for displaying menu data set to each hierarchical level of the menus in a screen display area, wherein the menu display means displays the menu data such that a plurality of items of the menu data are displayed for at least one hierarchical level, and wherein the menu display means comprises individual display width detection means for detecting a display width of each item of the menu data, total display width detection means for detecting a total display width required for displaying menu data to be displayed in the screen display area, comparison means for comparing the total display width with an area width of the screen display area, and display control means that, when new menu data at another hierarchical level are to be displayed in addition to menu data at at least one hierarchical level already displayed, detects the total display width of the menu data to be displayed including the new menu data, and if the detected total display width is larger than the area width of the screen display area, carries out a replacement process for replacing a plurality of items of the menu data at one of the at least one hierarchical level already displayed, with other menu data set to the one of the hierarchical levels, and then displays all the resulting menu data in the screen display area.

Preferably, the replacement process is repeatedly carried out at each hierarchical level until the total display width becomes smaller than the area width of the screen display area.

More preferably, the image display apparatus includes storage control means for carrying out, at each of a plurality of hierarchical levels already displayed, a process for storing a value of the total display width and a combination of items of the menu data at the plurality of hierarchical levels already displayed, whenever the total display width has become smaller than the area width of the screen display area through the replacement process, and extraction means for extracting one of stored combinations of the items of the menu data that has the maximum value of the total display width, the display control means displaying the new menu data at the another hierarchical level together with the menu data at respective hierarchical levels in the combination extracted by the extraction means, in the screen display area.

For instance, the menu data comprises image data.

Preferably, the menu data comprises at least one character code, the character code being converted to image data by using menu display font data, the menu display means displaying the image data as a menu.

Preferably, the image display apparatus includes input means capable of controlling the menu display means from outside of the image display apparatus.

More preferably, the image display apparatus has a WWW browser function, and wherein font data of the WWW browser is used as the menu display font data.

To attain the above object, according to a second aspect of the invention, there is provided an image display apparatus having menus of a plurality of hierarchical levels, the image display apparatus including menu display means for displaying menu data set to each hierarchical level of the menus in a screen display area, wherein the menu display means comprises starting means for starting a hierarchical menu at a first level in which an object selected in the screen display area is set to a first-occurring phrase which is first to occur in a statement, first display control means for displaying menu data representative of information items including functions executable on the object and parameters, in the screen display area, in a manner such that the menu data can be sequentially selected as menu options of subsequent phrases of the statement subsequent to the first-occurring phrase from hierarchical menus at subsequent levels subsequent to the first level, the first display control means sequentially displaying the menu options selected through menu option-selecting operations as a menu option string arranged in line with an menu option at a preceding level, and issuing means that, when the menu option string is completed as a command statement after the menu options have been sequentially selected, issues a command and command parameters for executing the command statement.

Preferably, the image display apparatus includes changing means that, when a phrase of a menu option at a subsequent level is temporarily selected, sequentially changes a particle of a phrase of a menu option at a preceding level selected during the menu option-selecting operations, at the subsequent level such that the particle of the phrase of the selected menu option at the preceding level becomes grammatically suitable for the phrase temporarily selected, if it is determined, based on suitable particle information stored in a table in advance, that the particle of the phrase of the selected menu option at the preceding level is not grammatically suitable for the phrase temporarily selected.

Preferably, the image display apparatus includes registration means for registering a plurality of phrases corresponding to a sequence of a plurality of menu options, under a new phrase which represents the plurality of phrases, and the first display control means displays the new phrase, as a part or a whole of the menu option string displayed by the first display control means.

More preferably, the image display apparatus includes second display control means for displaying the new phrase and the plurality of phrases which the new phrase represents, alternately at predetermined time intervals.

To attain the above object, according to a third aspect of the invention, there is provided an image display method for an image display apparatus, for displaying menu data set to each of a plurality of hierarchical levels of menus in a screen display area, the image display method comprising the steps of setting a plurality of items of the menu data to at least one hierarchical level, detecting a display width of each item of the menu data, detecting, when new menu data at another hierarchical level are to be displayed in addition to menu data at at least one hierarchical level already displayed, a total display width required for displaying the menu data to be displayed including the new menu data, comparing the total display width with an area width of the screen display area, carrying out a replacement process for replacing a plurality of items of the menu data at one of the at least one hierarchical level already displayed, with other menu data set to the one of the hierarchical levels, if the detected total display width is larger than the area width of the screen display area, and displaying the menu data in the screen display area.

Preferably, the replacement process includes repeatedly carrying out at each hierarchical level until the total display width becomes smaller than the area width of the screen display area.

More preferably, the image display method further including the steps of carrying out, at each of a plurality of hierarchical levels already displayed, a process for storing a value of the total display width and a combination of items of the menu data at the plurality of hierarchical levels already displayed, whenever the total display width has become smaller than the area width of the screen display area through the replacement process, and extracting one of stored combinations of the items of the menu data that has the maximum value of the total display width, wherein the step of displaying the menu data includes displaying the new menu data at the another hierarchical level together with the menu data at respective hierarchical levels in the combination extracted by the step of extracting the one combination, in the screen display area.

For example, the menu data comprises image data.

Preferably, the menu data comprises at least one character code, and the step of displaying the menu data includes converting the character code to image data by using menu display font data, and displaying the image data as a menu.

Preferably, the image display method includes the step of controlling the displaying of the menus from outside of the image display apparatus.

Preferably, the image display apparatus has a WWW browser function, and wherein font data of the WWW browser is used as the menu display font data.

To attain the above object, according to a fourth aspect of the invention, there is provided an image display method for an image display apparatus having menus, for displaying menu data set to each of a plurality of hierarchical levels of menus in a screen display area, the image display method comprising the steps of starting a hierarchical menu at a first level in which an object selected in the screen display area is set to a first-occurring phrase which is first to occur in a statement, displaying menu data representative of information items including functions executable on the object and parameters, in the screen display area, in a manner such that the menu data can be sequentially selected as menu options of subsequent phrases of the statement subsequent to the first-occurring phrase from hierarchical menus at subsequent levels subsequent to the first level, sequentially displaying the menu options selected through menu option-selecting operations as a menu option string arranged in line with an menu option at a preceding level, and issuing, when the menu option string is completed as a command statement after the menu options have been sequentially selected, a command and command parameters for executing the command statement.

Preferably, the image display method further includes the step of sequentially changing, when a phrase of a menu option at a subsequent level is temporarily selected, a particle of a phrase of a menu option at a preceding level selected during the menu option-selecting operations, at the subsequent level such that the particle of the phrase of the selected menu option at the preceding level becomes grammatically suitable for the phrase temporarily selected, if it is determined, based on suitable particle information stored in a table in advance, that the particle of the phrase of the selected menu option at the preceding level is not grammatically suitable for the phrase temporarily selected.

Preferably, the image display method further includes the step of registering a plurality of phrases corresponding to a sequence of a plurality of menu options, under a new phrase which represents the plurality of phrases, and the step of displaying the menu data includes displaying the new phrase, as a part or a whole of the menu option string.

More preferably, the step of sequentially displaying the menu options selected further includes displaying the new phrase and the plurality of phrases which the new phrase represents, alternately at predetermined time intervals.

To attain the above object, according to a fifth aspect of the invention, there is provided an image display system including at least one image display apparatus, wherein the image display apparatus having menus of a plurality of hierarchical levels, the image display apparatus including menu display means for displaying menu data set to each hierarchical level of the menus in a screen display area, wherein the menu display means displays the menu data such that a plurality of items of the menu data are displayed for at least one hierarchical level, and wherein the menu display means comprises individual display width detection means for detecting a display width of each item of the menu data, total display width detection means for detecting a total display width required for displaying menu data to be displayed in the screen display area, comparison means for comparing the total display width with an area width of the screen display area, and display control means that, when new menu data at another hierarchical level are to be displayed in addition to menu data at at least one hierarchical level already displayed, detects the total display width of the menu data to be displayed including the new menu data, and if the detected total display width is larger than the area width of the screen display area, carries out a replacement process for replacing a plurality of items of the menu data at one of the at least one hierarchical level already displayed, with other menu data set to the one of the hierarchical levels, and then displays all the resulting menu data in the screen display area.

To attain the above object, according to a sixth aspect of the invention, there is provided an image display apparatus having menus of a plurality of hierarchical levels, the image display apparatus including menu display means for displaying menu data set to each hierarchical level of the menus in a screen display area, wherein the menu display means comprises starting means for starting a hierarchical menu at a first level in which an object selected in the screen display area is set to a first-occurring phrase which is first to occur in a statement, first display control means for displaying menu data representative of information items including functions executable on the object and parameters, in the screen display area, in a manner such that the menu data can be sequentially selected as menu options of subsequent phrases of the statement subsequent to the first-occurring phrase from hierarchical menus at subsequent levels subsequent to the first level, the first display control means sequentially displaying the menu options selected through menu option-selecting operations as a menu option string arranged in line with an menu option at a preceding level, and issuing means that, when the menu option string is completed as a command statement after the menu options have been sequentially selected, issues a command and command parameters for executing the command statement.

To attain the above object, according to a seventh aspect of the invention, there is provided a computer-readable storage medium storing a program for executing an image display for an image display apparatus, for displaying menu data set to each of a plurality of hierarchical levels of menus in a screen display area, the program comprising a menu data-setting module for setting a plurality of items of the menu data to at least one hierarchical level, an individual display width-detecting module for detecting a display width of each item of the menu data, a total display width-detecting module for detecting, when new menu data at another hierarchical level are to be displayed in addition to menu data at at least one hierarchical level already displayed, a total display width required for displaying all the menu data to be displayed including the new menu data, a comparison module for comparing the total display width with an area width of the screen display area, a replacement process module for carrying out a replacement process for replacing a plurality of items of the menu data at one of the at least one hierarchical level already displayed, with other menu data set to the one of the hierarchical levels, if the detected total display width is larger than the area width of the screen display area, and a display module for displaying all the menu data in the screen display area.

Preferably, the replacement process module repeatedly carries out at each hierarchical level until the total display width becomes smaller than the area width of the screen display area.

More preferably, the program further includes a storage module for carrying out, at each of a plurality of hierarchical levels already displayed, a process for storing a value of the total display width and a combination of items of the menu data at the plurality of hierarchical levels already displayed, whenever the total display width has become smaller than the area width of the screen display area through the replacement process, and an extraction module for extracting one of stored combinations of the items of the menu data that has the maximum value of the total display width, the display module displaying the menu data includes displaying the new menu data at the another hierarchical level together with the menu data at respective hierarchical levels in the combination extracted by the step of extracting the one combination, in the screen display area.

For example, the menu data comprises image data.

Preferably, the menu data comprises at least one character code, and the display module converts the character code to image data by using menu display font data, and displays the image data as a menu.

Preferably, the program includes an input-responsive control module for controlling the displaying of the menus in response to an instruction input from outside of the image display apparatus.

More preferably, the image display apparatus has a WWW browser function, and the program uses the font data of the WWW browser as the menu display font data.

To attain the above object, according to an eighth aspect of the invention, there is provided a computer-readable storage medium storing an image display method for an image display apparatus having menus, for displaying menu data set to each of a plurality of hierarchical levels of menus in a screen display area, the program comprising a menu-starting module for starting a hierarchical menu at a first level in which an object selected in the screen display area is set to a first-occurring phrase which is first to occur in a statement, a menu data display module for displaying menu data representative of information items including functions executable on the object and parameters, in the screen display area, in a manner such that the menu data can be sequentially selected as menu options of subsequent phrases of the statement subsequent to the first-occurring phrase from hierarchical menus at subsequent levels subsequent to the first level, a menu option string display module for sequentially displaying the menu options selected through menu option-selecting operations as a menu option string arranged in line with an menu option at a preceding level, and an command issue module for issuing, when the menu option string is completed as a command statement after the menu options have been sequentially selected, a command and command parameters for executing the command statement.

Preferably, the program further includes a particle change module for sequentially changing, when a phrase of a menu option at a subsequent level is temporarily selected, a particle of a phrase of a menu option at a preceding level selected during the menu option-selecting operations, at the subsequent level such that the particle of the phrase of the selected menu option at the preceding level becomes grammatically suitable for the phrase temporarily selected, if it is determined, based on suitable particle information stored in a table in advance, that the particle of the phrase of the selected menu option at the preceding level is not grammatically suitable for the phrase temporarily selected.

Preferably, the program further includes a registration module for registering a plurality of phrases corresponding to a sequence of a plurality of menu options, under a new phrase which represents the plurality of phrases, and the menu data display module includes a display module for displaying the menu data includes displaying the new phrase, as a part or a whole of the menu option string.

More preferably, the menu option string display module includes an alternately-displaying module for sequentially displaying the menu options selected further includes displaying the new phrase and the plurality of phrases which the new phrase represents, alternately at predetermined time intervals.

The above and other objects, features, and advantages of the invention will become more apparent from the following detailed description taken in conjunction with the accompanying drawings.

BRIEF DESCRIPTION OF THE DRAWINGS

FIGS. 3A to 3E are diagrams showing menu images displayed by the FIG. 1 image display apparatus;

FIG. 13 is a diagram useful in explaining a data structure of menus at respective hierarchical levels, which are used in a command menu system of the FIG. 12 DTV equipment;

FIG. 14 is a diagram useful in explaining the data structure of menus at respective hierarchical levels, which are used in the command menu system of the FIG. 12 DTV equipment;

FIG. 15 is a diagram useful in explaining the data structure of menus at respective hierarchical levels, which are used in the command menu system of the FIG. 12 DTV equipment;

FIG. 16 is a diagram useful in explaining the data structure of menus at respective hierarchical levels, which are used in the command menu system-of the FIG. 12 DTV equipment;

FIG. 17 is a diagram useful in explaining the data structure of menus at respective hierarchical levels, which are used in the command menu system of the FIG. 12 DTV equipment;

FIG. 18 is a diagram useful in explaining the data structure of menus at respective hierarchical levels, which are used in the command menu system of the FIG. 12 DTV equipment;

FIG. 19 is a diagram useful in explaining the data structure of menus at respective hierarchical levels, which are used in the command menu system of the FIG. 12 DTV equipment;

FIG. 32 is a diagram which is useful in explaining a change in a particle of a preceding menu option, which is caused through operation of the command menu system according to the third embodiment;

FIG. 33 is a diagram which is useful in explaining a change in the particle of the preceding menu option, which is caused through operation of the command menu system according to the third embodiment;

FIG. 34 is a diagram which is useful in explaining a synthesized menu table used by the FIG. 12 DTV equipment;

FIG. 35 is a diagram which is useful in explaining an example of a command code line input to the FIG. 12 DTV equipment;

FIG. 36 is a diagram showing an example of a menu table used by an image display apparatus according to a fourth embodiment of the present invention when command phases are registered to the table;

DETAILED DESCRIPTION OF PREFERRED EMBODIMENTS

The present invention will now be described in detail with reference to drawings showing embodiments thereof.

[First Embodiment]

Figure 1:
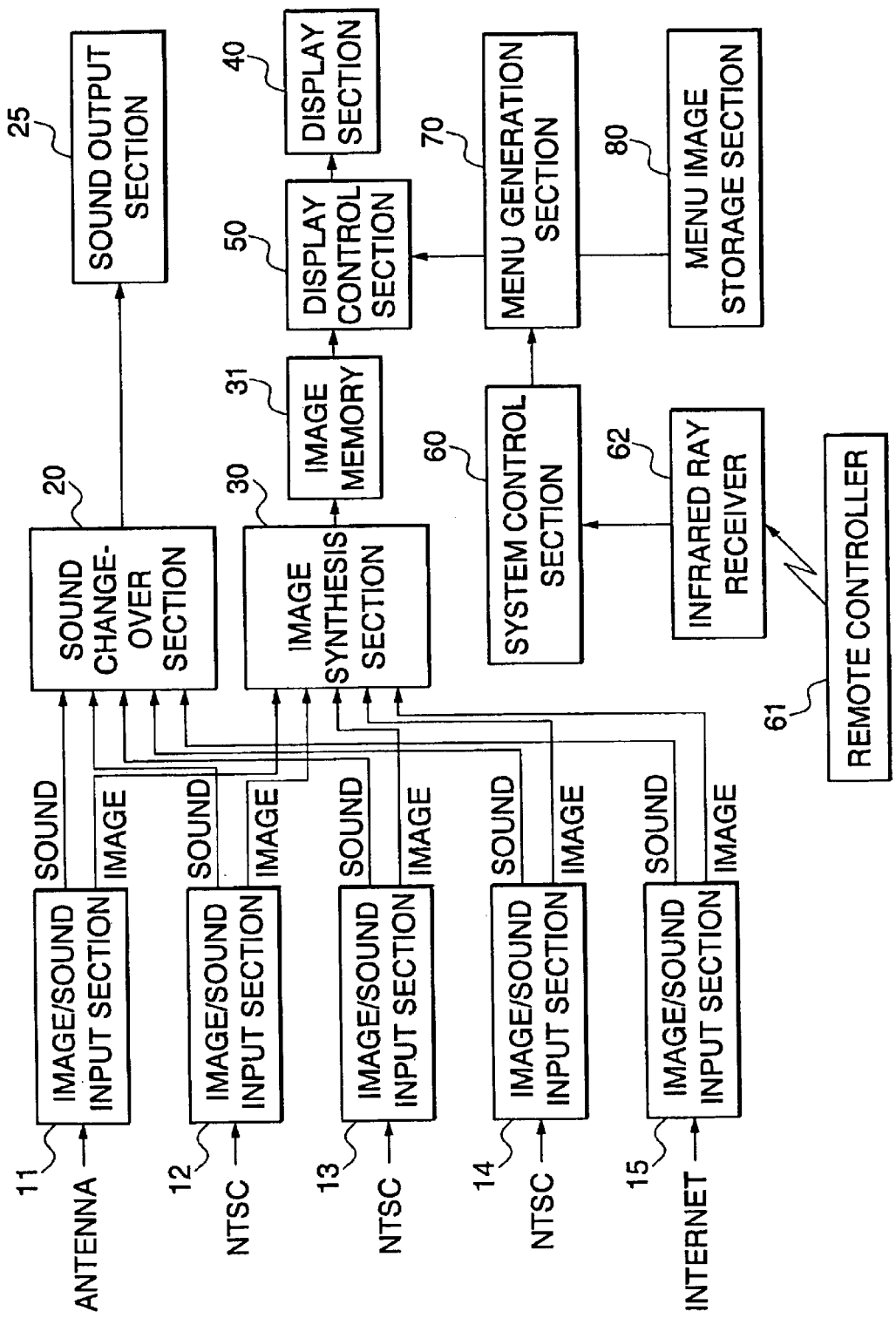
FIG. 1 is a block diagram showing the arrangement of essential parts and elements of an image display apparatus according to a first embodiment of the present invention.

Referring first to FIG. 1, there is shown a block diagram showing the essential parts and elements of an image display apparatus according to a first embodiment of the present invention.

The image display apparatus according to the present embodiment is formed e.g. by a multi-screen television receiver. In FIG. 1, reference numerals 11 to 15 designate image/sound input sections for receiving signals from respective image/sound sources and delivering digital image data and digital sound data.

For instance, the image/sound input section 11 is a digital broadcast receiver and is comprised of a tuner section for receiving signals received by an antenna, and subjecting the input signals to demodulation, error corrections, etc., to generate transport stream data (TS data), a demultiplexer for taking out desired image data and sound data from image data and sound data of a plurality of channels time-division-multiplexed into the TS data, a video decoder for decoding the image data, and an audio decoder for decoding the sound data.

Further, for instance, the image/sound input sections 12 to 14 are used for receiving analog image signals and analog sound signals e.g. of the NTSC system, and each comprised of an A/D converter, and a PLL (Phase Locked Loop) for generating an A/D sampling timing signal. Further, for instance, the image/sound input section 15 includes network means connected to the Internet directly or via a telephone line or an internet provider, and has a browser function for outputting WWW images and sounds.

Reference numeral 20 designates a sound changeover section for selecting one of digital sound data streams input from the image/sound input sections 11 to 15 to output the input data to a sound output section 25. The sound output section 25 converts the digital sound data input from the sound changeover section 20 to an analog signal which is delivered as a sound.

Reference numeral 30 designates an image synthesis section for subjecting each of digital image data streams input from the image/sound input sections 11 to 15 to enlargement/reduction processing, frame rate conversion processing, etc. to store the processed data item in an image memory 31. Further, the image synthesis section 30 generates a write address as required to store the image data in the write address of the image memory 31 such that the image data in the address becomes a picture image to be displayed in a display section 40.

Reference numeral 50 designates a display control section for reading out a picture image from the image memory 31 and outputting the same to the display section 40 for display. Further, when an operation menu is output from a menu generation section 70, the operation menu is output to the display section 40 in a state superimposed on the image read out from the image memory 31.

Figure 37A:
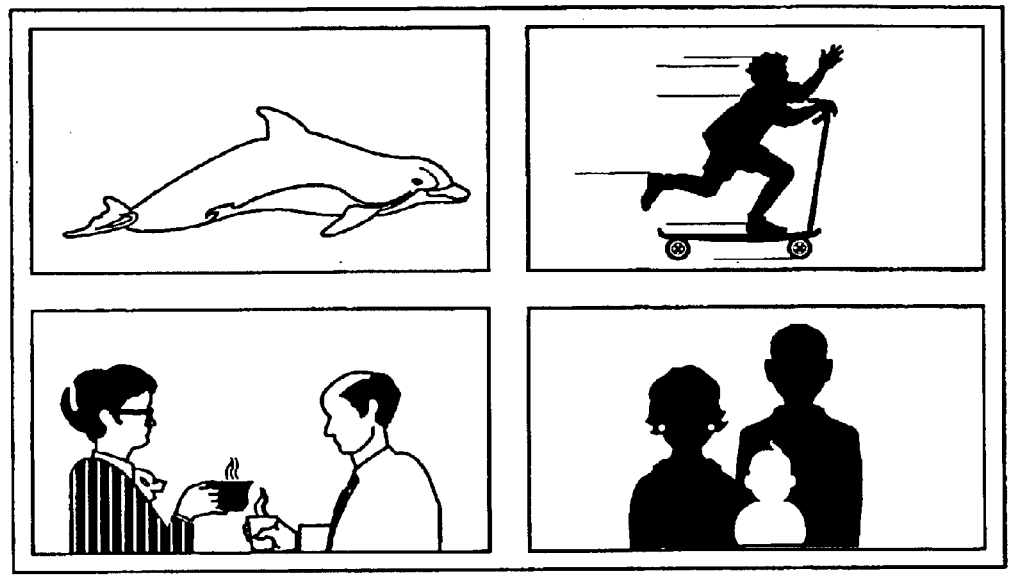
FIGS. 37A and 37B are diagrams showing conventional menu display screens.
Figure 37B:
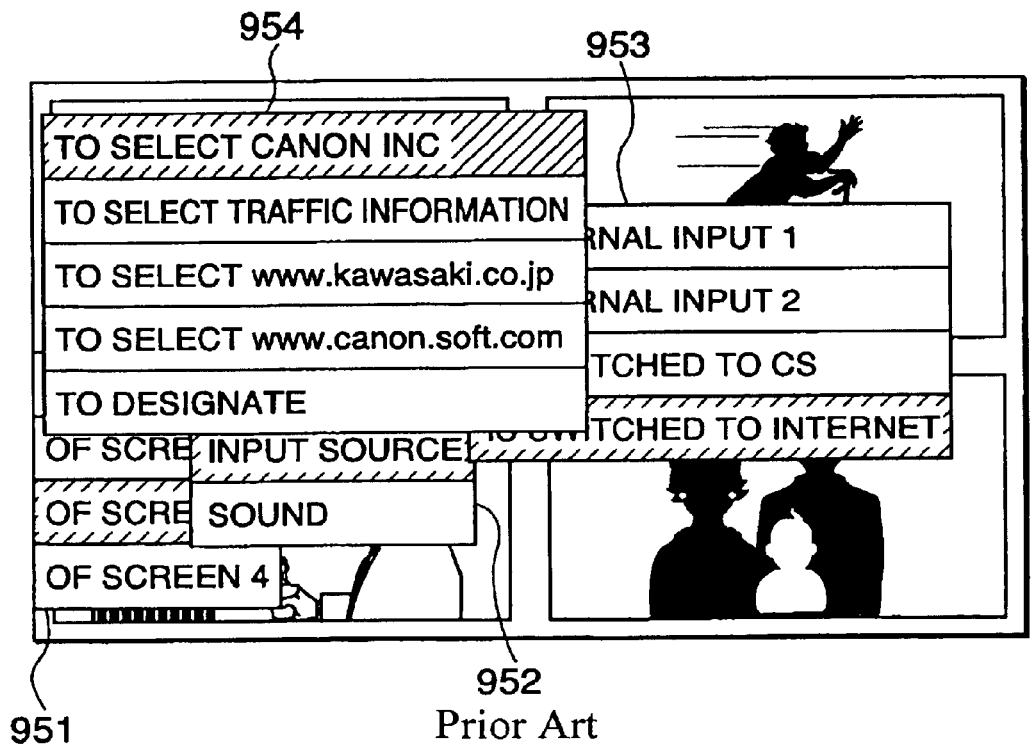
Figure 38:
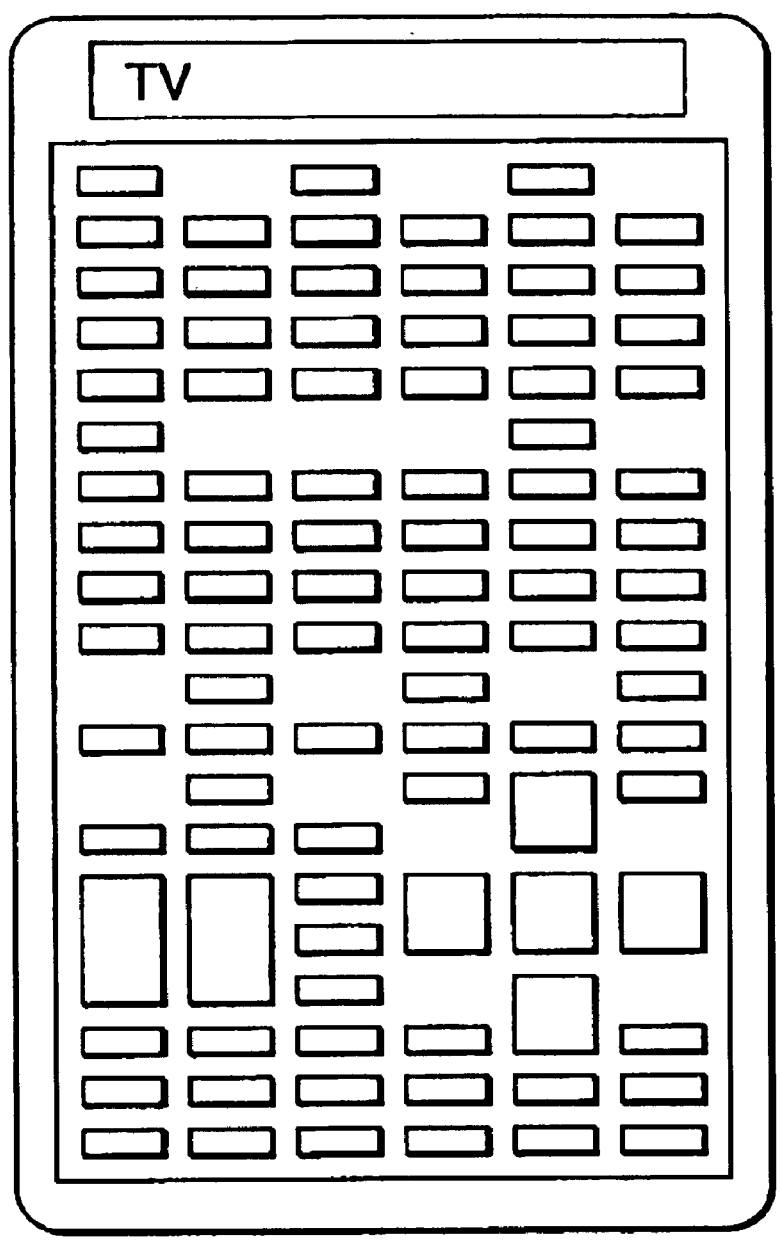
FIG. 38 is a plan view of the appearance of a conventional remote controller.
Figure 39:
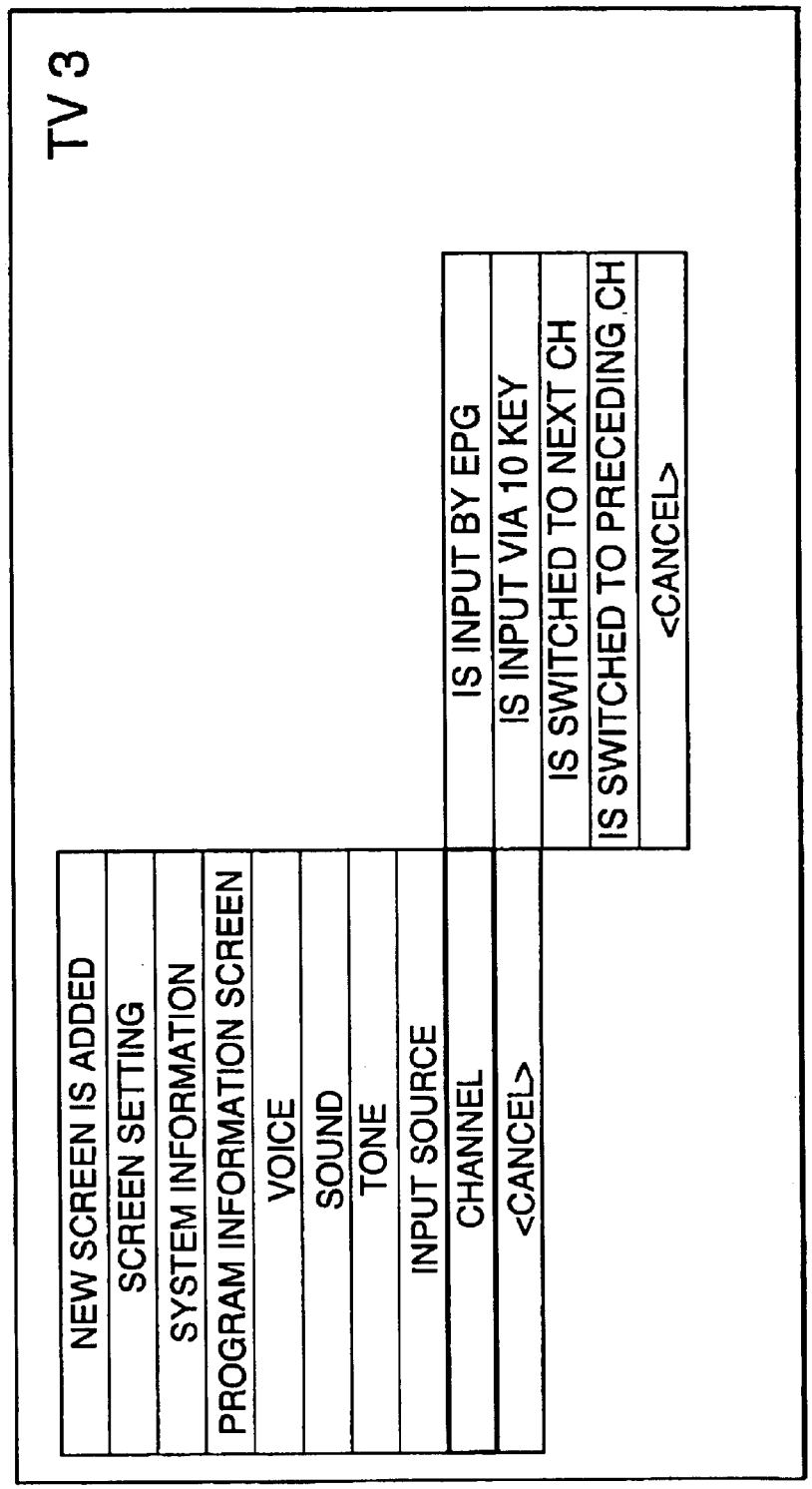
FIG. 39 is a diagram showing a conventional menu display screen.
Figure 40:
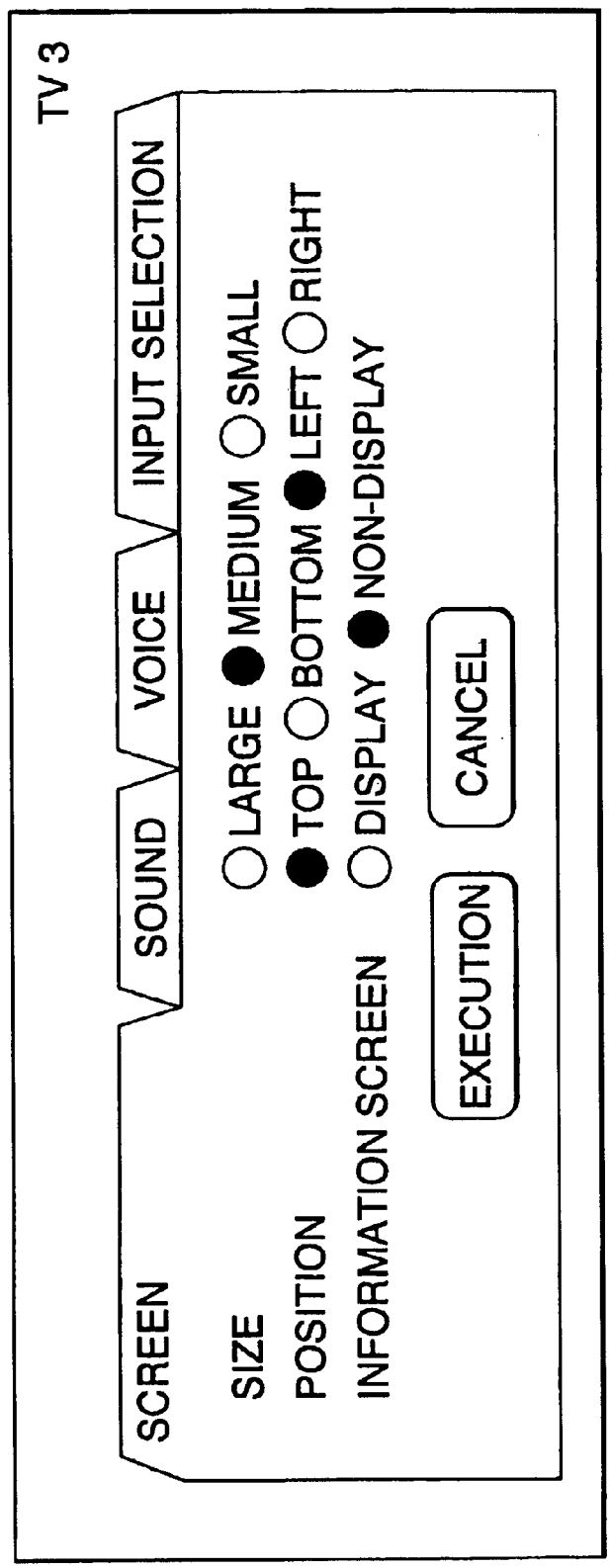
FIG. 40 is a diagram showing a conventional menu display screen.

Reference numeral 60 designates a system control section for carrying out centralized control over the whole of the television receiver according to the present embodiment. Each section is configured and controlled by the system control section 60, whereby it becomes possible to display images e.g. as shown in FIG. 37A.

Figure 2:
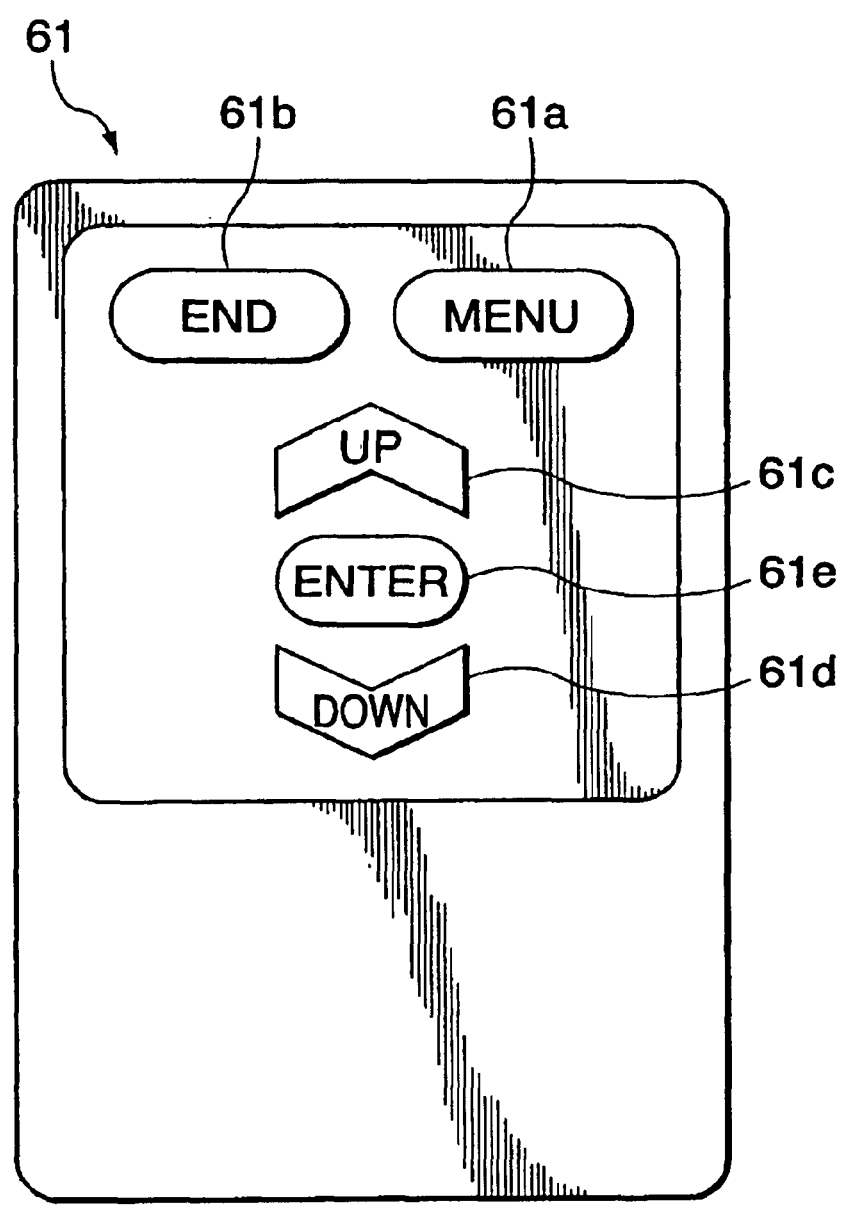
FIG. 2 is a diagram showing main keys that belong to a remote controller appearing in FIG. 1.

Reference numerals 61 and 62 designate an infrared ray remote controller and an infrared ray receiver, respectively. The system control section 60 is configured such that it can determine or detect a key operated by the remote controller 61, by using the infrared ray receiver 62. Main keys provided on the remote controller 61 are shown in FIG. 2. The system control section 60 notifies the menu generation section 70 of the detected key of the remote controller 61.

The menu generation section 70 generates a menu image in accordance with the key of which the menu generation section 70 is notified by the system control section 60. The generated menu image is displayed on the display section 40 by the display control section 50.

Reference numeral 80 designates a menu image storage section. In the present embodiment, the menu image storage section 80 stores menu images appearing in FIGS. 3A, 3B, 3C, 3D, and 3E, for instance. FIG. 3A is a diagram showing a menu image 81 at a first hierarchical level. In the menu image storage section 80 are stored not only the menu image 81 at the first hierarchical level but also the width, not shown, of the menu image 81, which realizes one of the characteristic features of the present invention. FIG. 3B is a diagram showing part of a menu image 82-1 at a second hierarchical level. This figure shows an operation menu image at the second hierarchical level, which corresponds to a third option (on SCREEN 3) of the menu at the first hierarchical level. Similarly to the first hierarchical level, the width of the menu image 82-1 at the second hierarchical level is stored in the menu image storage section 80. FIG. 3C is a diagram showing a second menu image 82-2 corresponding to the menu image 82-1 at the second hierarchical level, realizing a characteristic feature of the present invention. In this case as well, the width of the second menu image 82-2 at the second hierarchical level is stored in the menu image storage section 80. Similarly, FIG. 3D is a diagram showing part of a menu image 83 at a third hierarchical level, and FIG. 3E is a diagram showing part of a menu image 84 at a fourth hierarchical level. In the menu image storage section 80 are also stored the widths of the menu images 83 and 84 at the respective third and fourth hierarchical levels.

In the following, the characteristic operation of the present invention will be described. It should be noted that throughout the specification, menu options (i.e. command statement phrases) and statements formed thereby are translations of corresponding Japanese-language expressions, and description of grammatical features thereof is based on the grammar of the Japanese language which is particularly different from the English language in the word order, and includes "particles" vaguely corresponding to "prepositions" and other portions attached to "nouns" in English. However, it goes without saying the gist of the invention can be also properly applied to English language statements comprised of "phrases" which are used here to mean expressions each formed by at least one word (noun or verb), and the image display apparatus can be configured such that a proper English statement is formed e.g. by changing a word order (e.g. position of a preposition).

When the user operates a "MENU" key 61*a* of the remote controller 61 in order to display the operation menu, the system control section 60 notifies the menu generation section 70 of the detection of operation of the key 61*a*. In response to the notification, the menu generation section 70 reads out, from the menu image storage section 80, the width of the menu image 81 shown in FIG. 3A at the first hierarchical level, for storage, and the menu image 81 at the first hierarchical level to output the same to the display control section 50. At this time, the menu generation section 70 produces and outputs a cursor such that it can be determined which menu option the user has selected.

Figure 4:
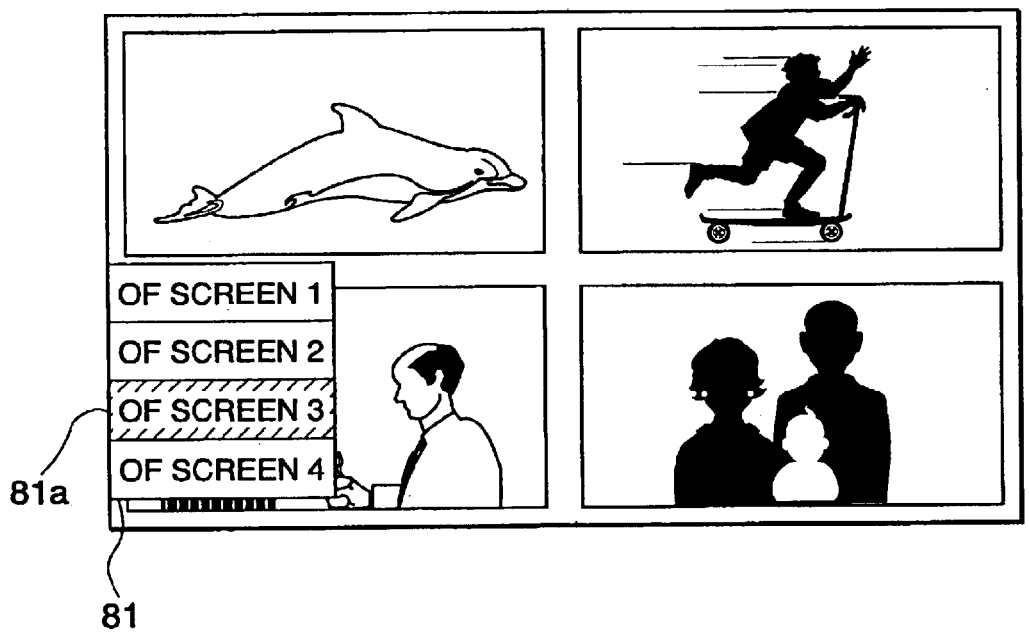
FIG. 4 is a diagram showing an example of a menu displayed by the FIG. 1 image display apparatus.

Then, when the user operates an "UP" key 61C or a "DOWN" key 61*d* arranged on the remote controller 61, the menu generation section 70 moves the cursor upward or downward of the selected option. FIG. 4 shows a display image displayed during the upward or downward motion of the cursor. In the figure, a third option (81*a* in the figure) in the menu image 81 at the first hierarchical level is displayed in a shaded manner so as to indicate that the cursor exists on the third item.

Next, when the user operates a "ENTER" key 61*e* of the remote controller 61, the menu generation section 70 reads out the width of a menu at the second hierarchical level corresponding to the option (the third option in this example) on which the cursor exists at the present time, i.e. the width of the menu image 82-1 shown in FIG. 3B, and adds the width to the width of the menu image 81 at the first hierarchical level which is stored previously, to compare the resulting sum with the width of a display area of the display section 40. It should be noted that the width of the display area of the display section 40 and the width of the picture image of the image memory 31 are coincident with each other.

If, as a result of the comparison, the sum of the width of the menu image 81 and that of the menu image 82-1 is smaller, the menu image 82-1 at the second hierarchical level is read out and output to the display control section 50 in combination with the menu image 81 at the first hierarchical level. Similarly to the above, in this case as well, the menu images 82-1 and 81 are output together with the cursor, and then the cursor is moved upward or downward of the option by operating the "UP" key 61C or the "DOWN" key 61*d* of the remote controller 61.

Figure 5:
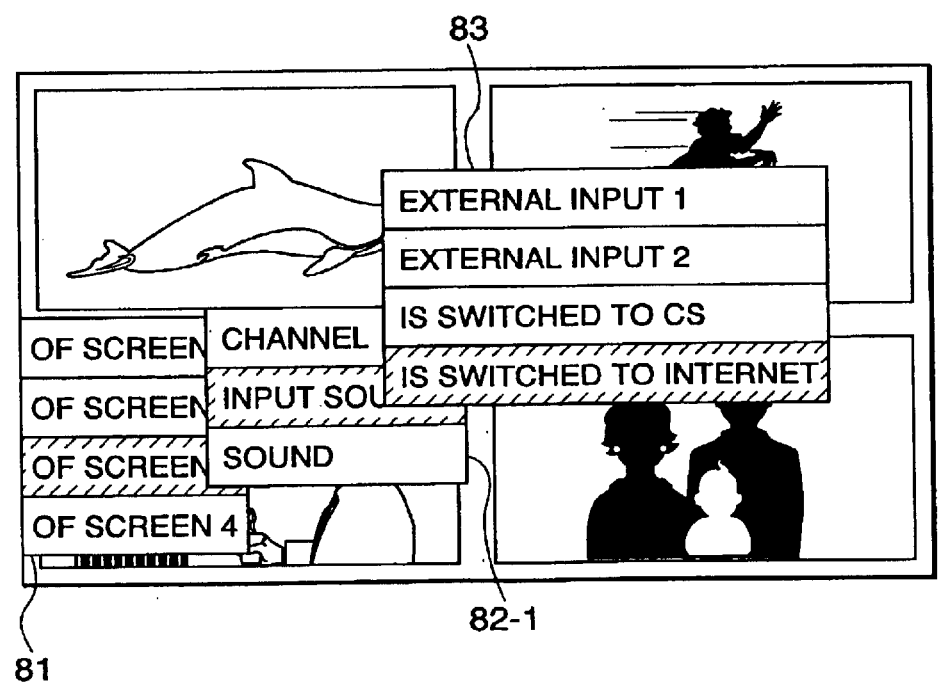
FIG. 5 is a diagram showing an example of menus displayed by the FIG. 1 image display apparatus.

Then, when the cursor exists on a second option (INPUT SOURCE) of the menu at the second hierarchical level, if the user operates the "ENTER" key 61*e* of the remote controller 61, similarly to the above, the width of a menu at the third hierarchical level corresponding to the second option on which the cursor is located at the present time, i.e. the width of the menu image 83 shown in FIG. 3D is added to the sum of the widths of the above menu images 81 and 82-1 to compare the resulting sum with the width of the display area of the display section 40, and the menu image 83 is read out for display. FIG. 5 shows an image of the display section 40 displayed at this time.

It goes without saying that when the widths of menu images at the respective hierarchical levels are added together, if, as shown in FIG. 5, the menu images at the respective hierarchical levels overlap each other, a more accurate value can be obtained by subtracting the length of the overlapping portions from the sum of the widths of the menu images at the respective hierarchical levels. Further, it is obvious that the widths of the respective menu images at the second and third hierarchical levels may be stored in the menu image storage section 80 as values obtained by subtracting the widths of the overlapping portions therefrom in advance.

Then, when the cursor is placed on a fourth option (IS SWITCHED TO INTERNET) of the menu image 83 at the third hierarchical level, if the user operates the "ENTER" key 61e of the remote controller 61, similarly to the above, the width of a menu at the fourth hierarchical level corresponding to the fourth option on which the cursor exists at the present time, i.e. the width of the menu image 84 shown in FIG. 3E is added to the sum of the widths of the above menu images 81, 82-1, and 83 to compare the resulting sum with the width of the display area of the display section 40. Let it be assumed that as a result of the above comparison, the resulting sum i.e. the width of the added menu images has become larger than that of the display area of the display section 40.

Figure 7:
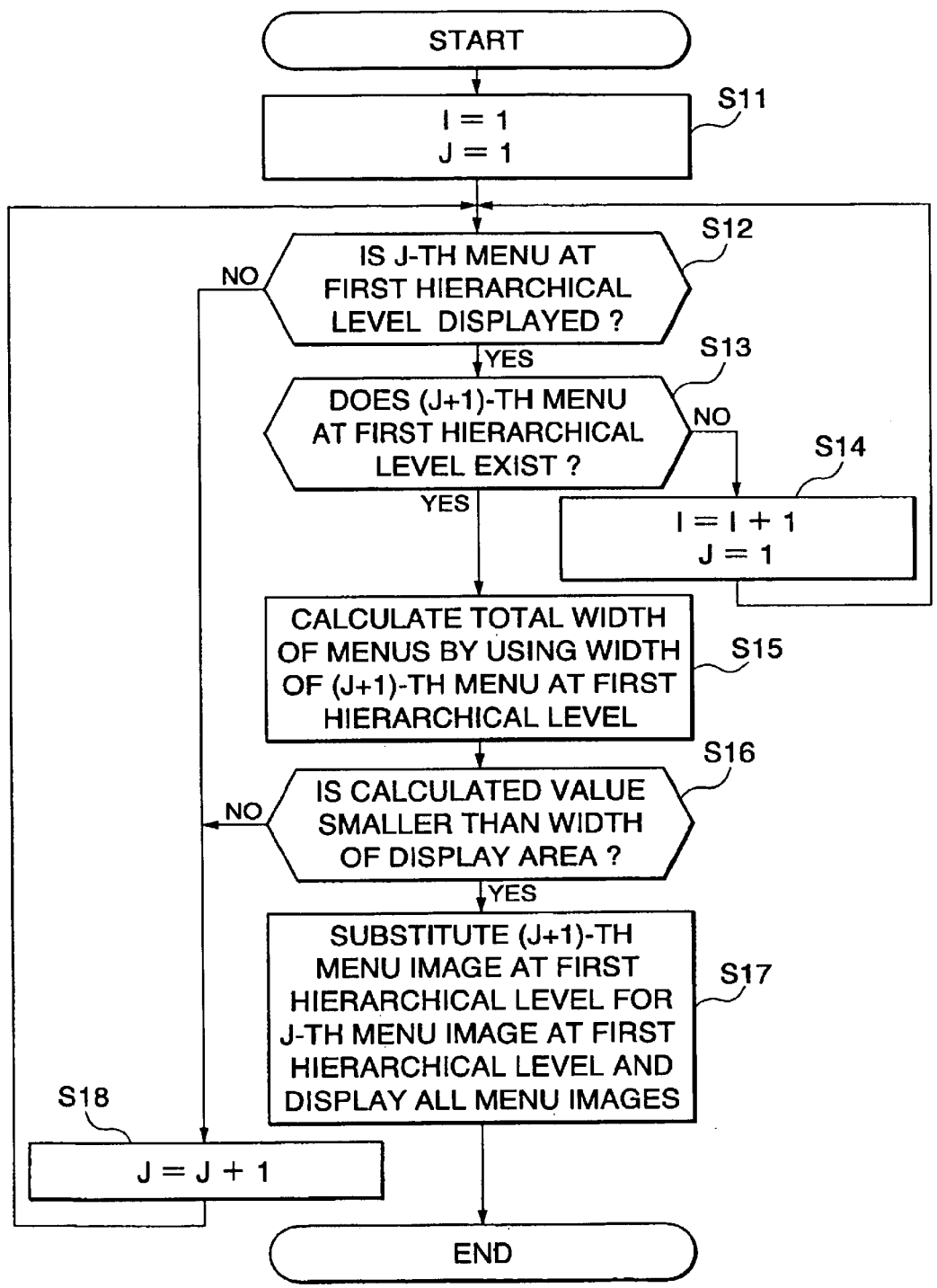
FIG. 7 is a flowchart showing a flow of an operation carried out by the image display apparatus according to the first embodiment.

This assumption implies that if the menu image at the fourth hierarchical level is read out for display as described above, it is impossible to display all the menus in the display section 40. In such a case, the menu generation section 70 carries out the following operation in accordance with a flowchart shown in FIG. 7. It should be noted that if a program following this flowchart is stored in a storage device in the system control section 60, for execution, it is possible to implement the following control method.

First, a first menu at the first hierarchical level is displayed at the present time (step S11, step S12), and hence a second menu at the first hierarchical level is searched for in the menu image storage section 80 at a step S13. The second menu at the first hierarchical level does not exist here, and next, since a first menu at the second hierarchical level is displayed at the present time (step S12), a second menu at the second hierarchical level is searched for in the menu image storage section 80 at the step S13. Now, the second menu at the second hierarchical level exists, so that the width of the second menu at the second hierarchical level, i.e. the width of the menu image 82-2 shown in FIG. 3C is read out, and substituted for the width of the image of the first menu at the second hierarchical level, which was used prior to the same as a menu at the second hierarchical level, to recalculate the sum of widths of respective menu images at the first to fourth hierarchical levels at a step S15. Then, the width obtained as above is compared with the width of the display area of the display section 40 at a step S16. Now, let it be assumed that the comparison shows that the above newly obtained total width of the menu images is smaller than the width of the display area of the display section 40. Next, at a step S17, the menu generation section 70 reads out the second menu image 82-2 at the second hierarchical level, and substitutes it for the first menu image 82-1 at the second hierarchical level. Further, at the step S17, the menu generation section 70 reads out the menu image at the fourth hierarchical level, and outputs all the menu images at the first to fourth hierarchical levels to the display control section 50.

Figure 6:
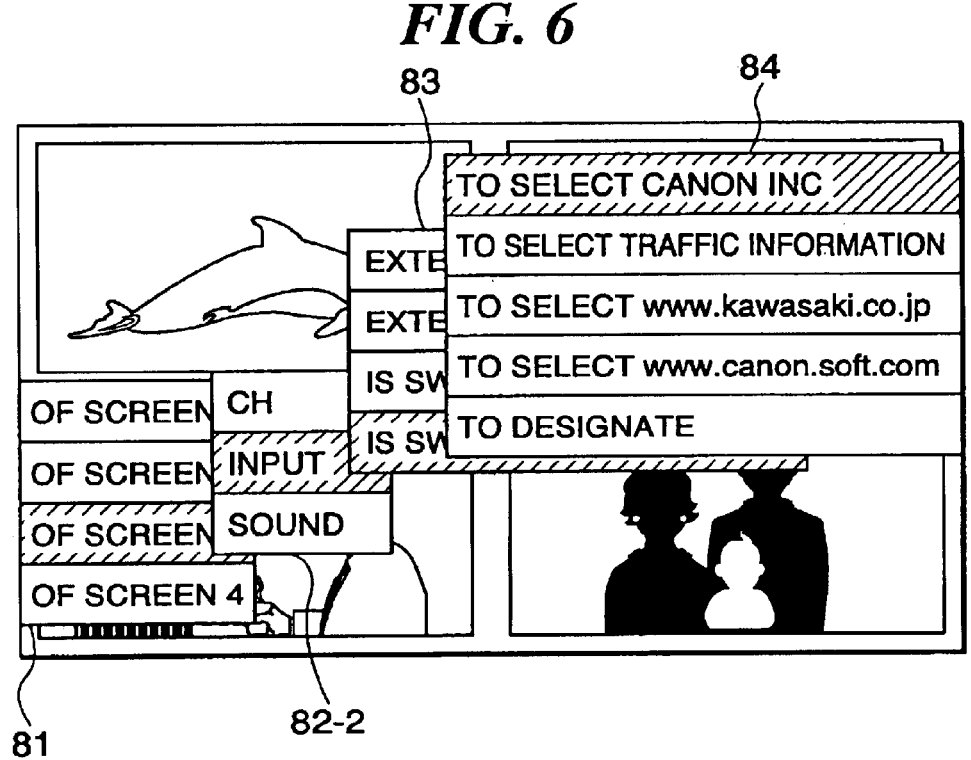
FIG. 6 is a diagram showing an example of menus displayed by the FIG. 1 image display apparatus.

As a result of the above operation, all the menus are displayed on the display section 40. FIG. 6 illustrates the menu images displayed on the display section 40 at this time.

In the above operation of the menu generation section 70, if the sum of the widths of the menu images recalculated by using the width of the second menu image 82-2 at the second hierarchical level is larger than the width of the display area of the display section 40, the program shifts via a step S18 to an operation for searching for a third menu at the second hierarchical level, or subsequently, via a step S14 to an operation for searching for a second menu at the third hierarchical level, whereby the same operation as described above is repeatedly executed.

It is obvious that when the second menu at the first hierarchical level exists in the menu image storage section 80, similarly to the above, the width of the second menu image at the first hierarchical level may be used to carry out the same recalculating operation as described above. Further, it is also obvious that if neither the second menu at the first hierarchical level nor the second menu at the second hierarchical level exists, the program proceeds to an operation for searching for a second menu at the third hierarchical level, whereby the same operation as described above is repeatedly carried out.

When the user moves the cursor onto a desired menu option, such as "TO SELECT CANON INC", "TO SELECT TRAFFIC INFO", "TO SELECT www.kawasaki.co.jp", or "to SELECT www.canon.soft.com", at the fourth hierarchical level in the state of FIG. 6, and operates the "ENTER" key 61e of the remote controller 61, the menu generation section 70 notifies the system control section 60 of the menu option selected and determined by the user since the menu at the fourth hierarchical level is located at the lowest hierarchical level.

The system control section 60 properly sets and controls relevant sections appearing in FIG. 1 according to the notification, whereby it becomes possible to adjust, configure, and control the user's television receiver according to the present embodiment.

[Second Embodiment]

Figure 8:
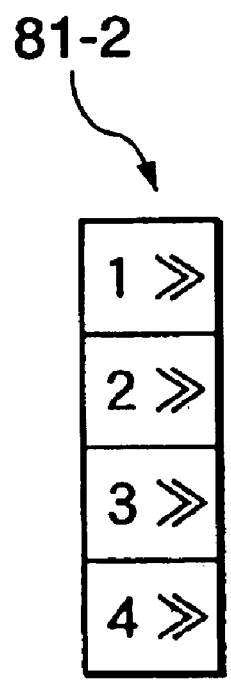
FIG. 8 is a diagram showing a menu image displayed by an image display apparatus according to a second embodiment of the present invention.

Although the arrangement of essential parts and elements of a television receiver according to a second embodiment of the present invention is the same as that of the essential parts and elements of the first embodiment 1 shown in FIG. 1, the second embodiment is distinguished from the first embodiment in that the menu image storage section 80 stores a second menu image 81-2, shown in FIG. 8, at the first hierarchical level and the width thereof. Further, the second embodiment is distinguished from the first embodiment in that it executes a different operation when the sum of widths of menu images recalculated by the menu generation section 70 is larger than that of the display area the display section 40.

Figure 9:
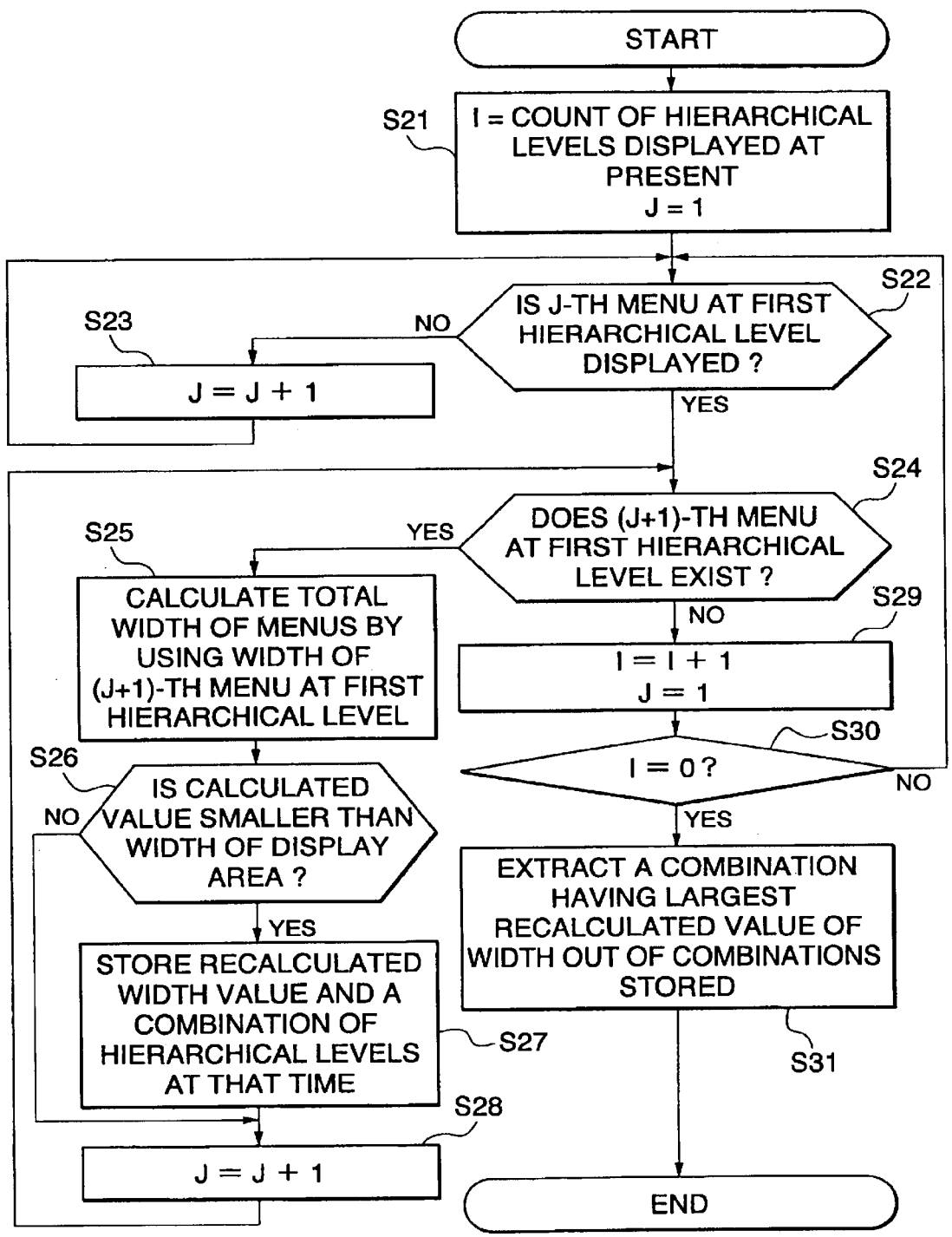
FIG. 9 is a flowchart showing a flow of an operation carried out by the image display apparatus according to the second embodiment.

FIG. 9 is a flowchart showing a flow of an operation carried out by an image display apparatus according to the second embodiment. It should be noted that if a program following this flowchart is stored in a storage device in the system control section 60, for execution, it is possible to implement the following control method.

Now, let it be assumed that similarly to the first embodiment, the user operates the remote controller 61 to thereby display the menus at the first to third hierarchical levels as illustrated in FIG. 5. When the user operates the "ENTER" key 61e of the remote controller 61, similarly to the first embodiment, the menu generation section 70 adds the width of a menu image at the fourth hierarchical level to the sum of widths of menu images at the first to third hierarchical levels, to find that the resulting sum has exceeded the width of the display area of the display section 40.

In the second embodiment as well, similarly to the first embodiment, the first menu at the first hierarchical level is displayed at the present time (steps S21, S22, S23), and the menu generation section 70 searches for a second menu at the first hierarchical level in the menu image storage section 80 at a step S24. Since the second menu at the first hierarchical level exists in the second embodiment, at a step S25, the menu generation section 70 reads out the width of the second menu at the first hierarchical level, i.e. the width of the menu image 81-2 shown in FIG. 8, substitutes the same for the width of the image of the first menu at the first hierarchical level, which was used prior to the menu image 81-2, and recalculates the total width of the menu images at the first to fourth hierarchical levels. The resulting sum is compared with the width of the display area of the display section 40 at a step S26. Here, it is assumed that the comparison shows that the newly obtained total width of the menu images is smaller than the width of the display area of the display section 40.

Figure 10:
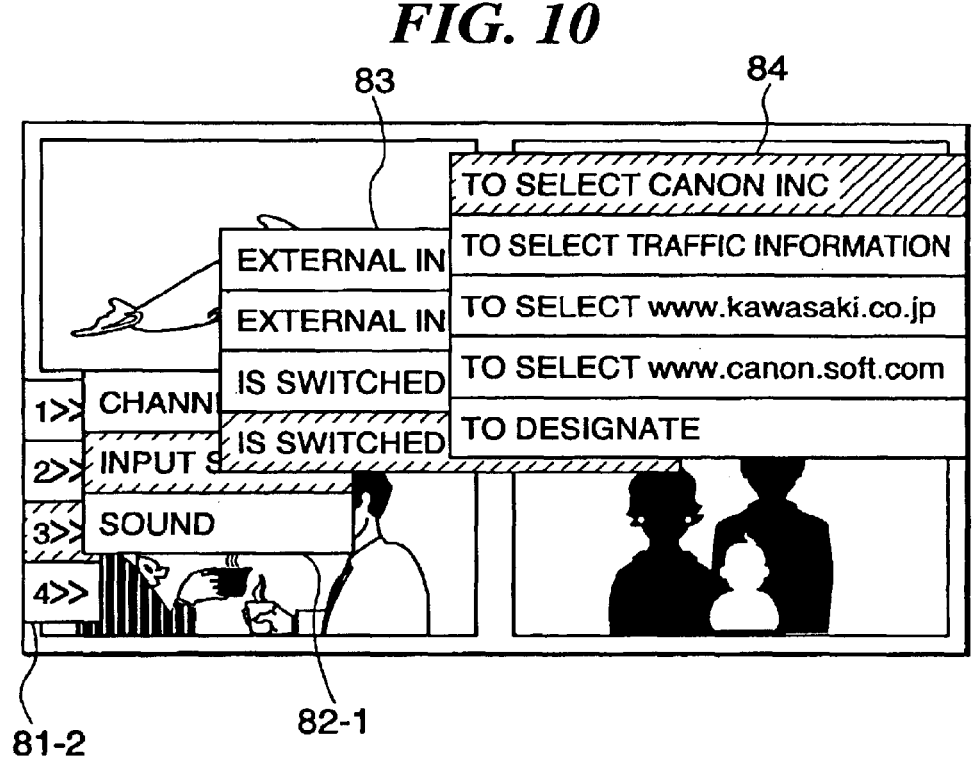
FIG. 10 is a diagram showing an example of menus displayed by the image display apparatus according to the second embodiment.

Although at this time, the menu generation section 70 in the first embodiment would read out the second menu image at the first hierarchical level, and substitute the same for the first menu image at the first hierarchical level for display, in the second embodiment, the second menu image is not displayed at this time or immediately after the comparison, but the program proceeds to an operation described in the following. It should be noted that if the image display apparatus of the first embodiment were used for processing, the menu images as shown in FIG. 10 would be displayed on the display section 40.

In the second embodiment, since the resulting sum by the recalculation is smaller than the width of the display area of the display section 40, the menu generation section 70 stores the resulting sum of widths of the menu images and the combination of the displayed menus, i.e. the second menu at the first hierarchical level, the first menu at the second hierarchical level, and the first menu at the third hierarchical level, at a step S27.

Now, since the second menu at the first hierarchical level exists in the menu image storage section 80, a third menu at the first hierarchical level is searched for in the menu image storage section 80 at the step S24 by way of a step S28. Here, the third menu at the first hierarchical level does not exist (step S29, step S30), and the first menu at the second hierarchical level is displayed (step S22), and hence a second menu at the second hierarchical level is searched for in the menu image storage section 80 at the step S24. Since the second menu at the second hierarchical level exists, the width of the image thereof is read out, and added in place of the width of the first menu at the second hierarchical level at the step S25 to recalculate the sum of widths of respective menu images at the first to fourth hierarchical levels for comparison of the resulting sum with the width of the display area of the display section 40 at the step S26. Now, the comparison shows that the obtained total width of the menu images is smaller than the width of the display area of the display section 40, and similarly to the above, the menu generation section 70 stores the resulting sum and the combination of the displayed menus, i.e. the first menu at the first hierarchical level, the second menu at the second hierarchical level, and the first menu at the third hierarchical level at the step S27.

Then, since the second menu at the second hierarchical level exists in the menu image storage section 80, the third menu at the second hierarchical level is searched for in the menu image storage section 80 at the step S24 by way of the step S28. The third menu at the second hierarchical level does not exist (step S29, step S30), and the first menu at the third hierarchical level is displayed at the present time (step S22), so that the second menu at the third hierarchical level is searched for in the menu image storage section 80 at the step S24. The second menu at the third hierarchical level does not exist, and the program is to proceed to the next operation. However, since the menu at the fourth hierarchical level is not yet displayed (step S29, step S30), the sequence of processes described above is terminated here.

Then, at a step S31, the menu generation section 70 extracts a combination of menus for display which provides the largest sum of widths of menu images of all the combinations of menus for display which have been found by the comparisons to provide respective total widths smaller than the width of the display area of the display section 40 and stored in the menu generation section 70. More specifically, out of the combination (1) of the second menu at the first hierarchical level, the first menu at the second hierarchical level, and the first menu at the third hierarchical level, and the combination (2) of the first menu at the first hierarchical level, the second menu at the second hierarchical level, and the first menu at the third hierarchical level, a combination with the largest sum of widths of menu images, that is, in the present embodiment, the combination (2) is extracted.

Next, the above extracted combination (2) of the menus at the respective hierarchical levels and further the menu image at the fourth hierarchical level are output to the display control section 50. By carrying out the above operations, all the menus are displayed on the display section 40. At this time, the display section 40 displays the same menu images as displayed in FIG. 6.

Hereinafter, similarly to the first embodiment, the user selects and determines a desired option in the menu at the fourth hierarchical level, whereby it becomes possible to adjust, configure, and control the television receiver according to the present embodiment.

As distinguished from the first embodiment, the present embodiment permits menu images to be displayed by making the most of the display area (FIG. 10). In other words, displayed contents of the menus are made more detailed than in the first embodiment, and hence it is easier for a user to view or confirm the contents of the menus.

It should be noted that the present invention is not limited to the illustrated examples of the embodiments, but various variations and modifications are possible. For instance, (1) although in the above first and second embodiments, the menu images are stored in the menu image storage section 80 as image data, this is not limitative, but font data may be provided to thereby store character codes (sets) in the menu image storage section 80. In this case as well, it is obvious that it is possible to obtain the width of menus displayed on the display section 40 based on the number of characters and the width of a font used for display, whereby the functions of the first and second embodiments can be implemented.

(2) Although, in general, font data requires a large amount of memory, the television receivers according to the first and second embodiments have a browser function. Normally, the browser function necessitate font data, and therefore, these television receivers have the font data. Therefore, by sharing the font data with the browser function, it is possible to prevent an increase in memory for storing font data. Further, by using character codes as data for storage in the menu image storage section 80, the capacity of the menu image storage section 80 can be reduced.

(3) Even if a character code set is not provided as data of second menus at respective hierarchical levels, it is possible to obtain the advantageous effects of the invention by reducing the size of a font for displaying menu images.

[Third Embodiment]

Figure 11:
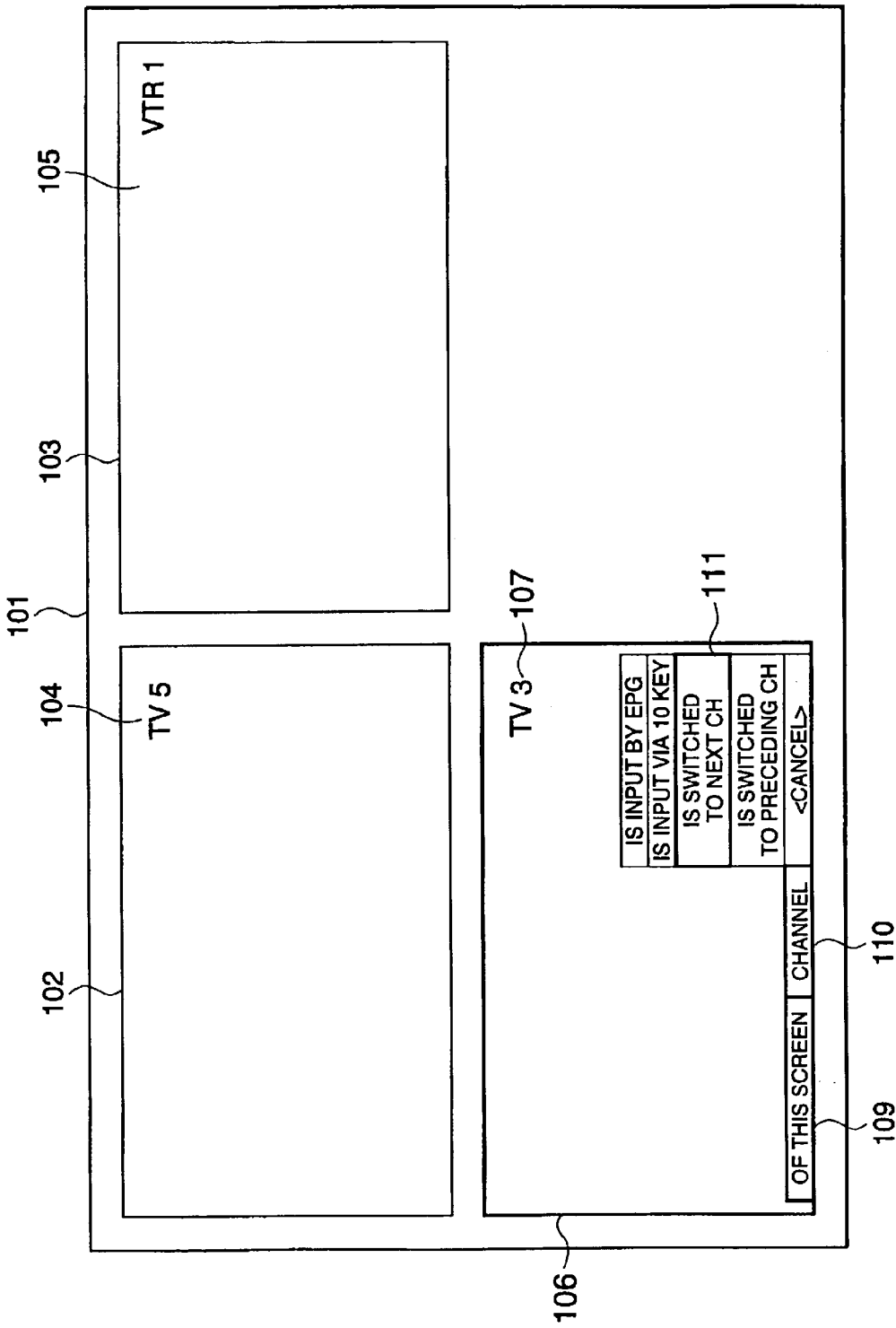
FIG. 11 is a diagram showing a display screen of an image display apparatus (DTV equipment) according to a third embodiment of the present invention.

FIG. 11 is a diagram showing a display screen for an image display apparatus according to a third embodiment of the present invention, which illustrates characteristic features of an operation menu system of the present embodiment.

Reference numeral 101 designates a display screen of DTV equipment. Although normally, the display screen of DTV equipment is capable of displaying a single video source, the FIG. 11 display screen functions as a parent screen which displays several child screens thereon.

Reference numerals 102, 103 and 106 designate child screens which are displayed on the parent screen 101 and capable of displaying video images based on respective different video sources. Particularly, the child screen 106 has a display frame highlighted as is distinct from the other child screens such that the user can easily understand that the child screen 106 is selected for operation. Further, reference numerals 104, 105 and 107 designate respective images of information which are each displayed by the DTV equipment separately from a video image being displayed on the corresponding child screen, in order to provide an auxiliary display of the type or channel information of the input source of the video image. The user can selectively display or not display each of the images.

Reference numeral 109 designates a phrase of a statement or sentence which appears first of all the phrases of the statement when the operation mode of the child screen is switched to a command mode. More specifically, in a state in which the child screens 102, 103 and 106 are being displayed on the display screen 101, and at the same time the child screen 106 is selected for operation, when the operation mode is switched to the command mode, the phrase 109 appears first of all the phrases of the statement. This phrase 109 is displayed explicitly on a bottom of the child screen 106 as a phrase of "OF THIS SCREEN" in order to suggest to the user that the screen 106 is an object of the command operation.

Reference numeral 110 designates a phrase of the statement, indicating the contents of the operation carried out on the object. More specifically, similarly to the phrase 109, when the operation mode is switched to the command mode, the phrase 110 indicates a detail of the operation to be carried out on the object, which is finally selected out of options displayed in a menu. Here, the phrase 110 "CHANNEL" is displayed to mean change of the channel, as part of a line of the statement, continued from the above display of "OF THIS SCREEN".

Reference numeral 111 designates a menu displayed when the above-mentioned phrase 110 "CHANNEL" has been selected. FIG. 11 shows a state of the menu in which an option "IS SWITCHED TO NEXT CH" is being displayed in an emphasized frame to indicate that the option is being selected. This option or portion of the above-mentioned statement means that a channel next to the channel currently receiving broadcast on the child screen 106 of the DTV equipment is selected.

Then, upon execution of a selection-completing operation, a command statement for operating the child screen 106, i.e. a line of command statement formed of the phrases "OF THIS SCREEN", "CHANNEL", and "IS SWITCHED TO NEXT CH" is formed for display, and immediately then the command is executed, that is, the broadcast channel currently being received on the child screen 106 is switched to the next channel to display the video image of the same.

Figure 12:
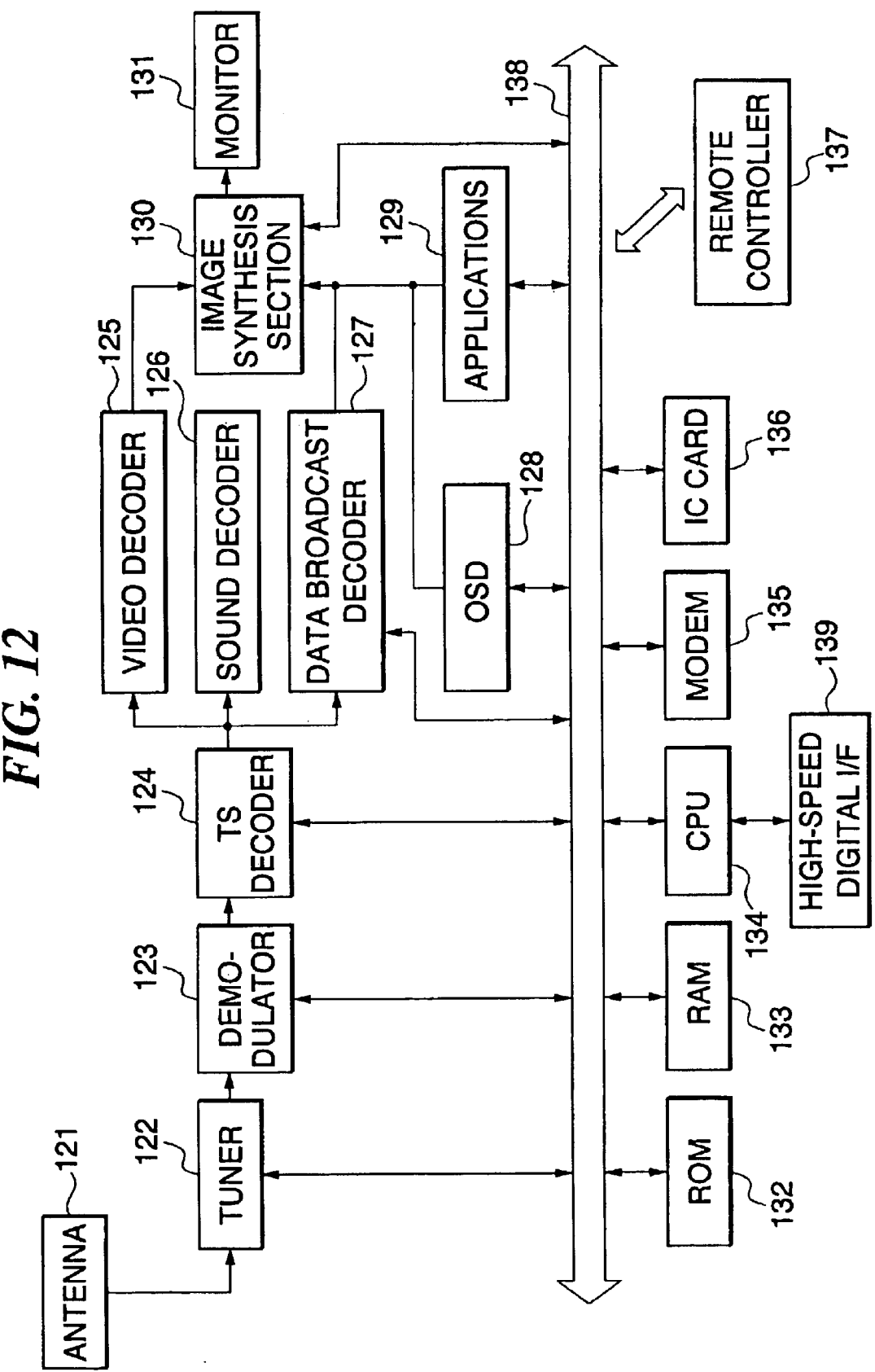
FIG. 12 is a block diagram schematically showing the arrangement of the DTV equipment according to the third embodiment.

FIG. 12 is a block diagram schematically showing the arrangement of the DTV equipment according to the present embodiment.

Reference numeral 121 designates an antenna for receiving broadcast radio waves for the DTV equipment, and reference numeral 122 designates a tuner for selecting a target broadcast wave from the broadcast radio waves received by the antenna 121. Reference numeral 123 designates a demodulation circuit for demodulating the selected broadcast wave into a stream signal, and decoding the stream signal as required. Reference numeral 124 designates a TS decoder circuit for separating the stream signal into individual stream signals. Reference numerals 125, 126 and 127 designate individual decoder circuits for decoding a video stream signal, a sound stream signal, and a data broadcast stream signal, respectively.

Reference numeral 128 designates an OSD display circuit for displaying the functioning state of the DTV equipment and various kinds of information thereof. Reference numeral 129 designates applications, such as an electronic program guide (EPG), an information browser, and a mailer, installed on the DTV equipment. Reference numeral 130 designates an image synthesis section for synthesizing an image by superposing a desired combination of images obtained from respective video signals obtained from the above decoders, and images obtained by the OSD display circuit and the applications, or alternatively images to be displayed on a plurality of child screens arranged side by side in the parent screen 101, from the above-mentioned images. Reference numeral 131 designates a monitor for displaying the image or images formed by the image synthesis section 130.

Further, reference numeral 132 designates a ROM device which stores software for controlling the DTV equipment, software applications, and data. Reference numeral 133 designates a RAM device which stores software for controlling the DTV equipment, and software applications themselves, and is used as a work area during operation thereof. Reference numeral 134 designates a CPU device for carrying out control of the DTV equipment and applications. Reference numeral 135 designates a modem device which is used when the DTV equipment communicates with external devices. Reference numeral 136 designates an IC card device which is connected to the DTV equipment, and stores user ID information, information for billing and authentication, and an identification key for decoding data.

Reference numeral 137 designates a remote controller device for carrying out operations on the DTV equipment, and reference numeral 138 designates a bus device which is used for transmitting signals and data between the circuits of the DTV equipment and the CPU device 134, for executing communications and control. Reference numeral 139 designates a high-speed digital I/F connected to the CPU 134.

FIGS. 13 to 19 are diagrams which are useful in explaining data structures of menus at respective hierarchical levels. These menus are used in a command menu system for the DTV equipment according to the present embodiment.

In the data structures shown in a tabular form in these figures, "menu ID" (shown in capital letters in the figures, and the same applies to the following) indicates a menu, and is used for identification thereof, and "individual ID" indicates a menu option existing in each menu and is used for identification thereof. "Preceding particle control information" indicates a condition for changing a particle (particle or portion equivalent to a particle, hereinafter simply referred to as "particle) of the preceding phrase, and a change point, if the particle of the preceding phrase is unsuitable for the present statement, when a menu option referred to by the "individual ID" is about to be displayed following a finally-determined menu command statement portion, i.e. the preceding phrase(s).

"Command statement phrase body" is a body of a command statement phrase which is used in displaying each menu option, and constitutes the command statement phase together with a particle of the command statement described in "command statement particle" following the "command statement phrase body". "Command code" designates an area which stores a command code and a parameter for forming part of a command code line which is issued when the command statement is completed upon selection and determination of the menu options. "Next connector information" is used for describing a menu ID of a menu to be displayed next after the menu option has been selected and finally determined.

Figure 20:
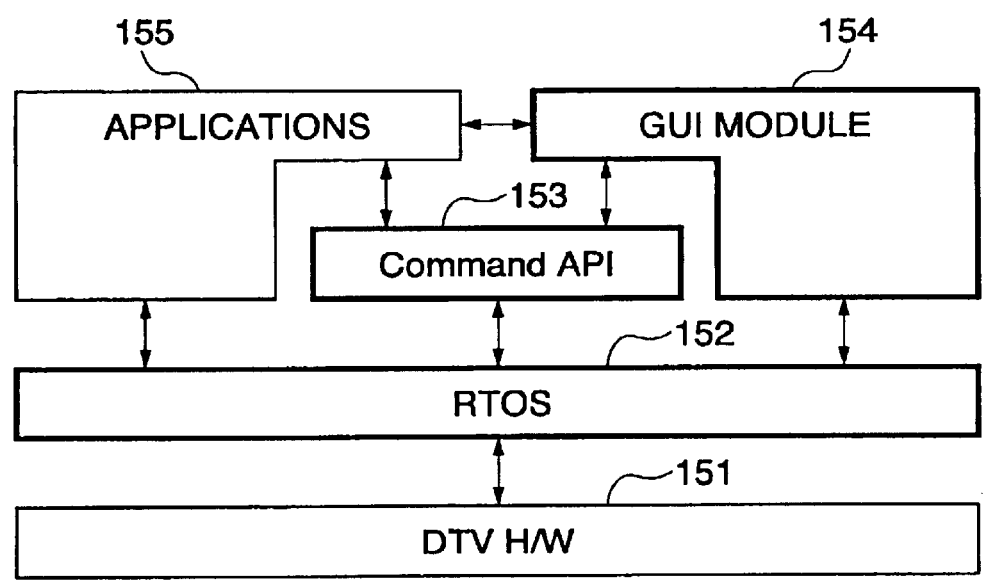
FIG. 20 is a block diagram showing a hierarchical structure of software used by the DTV equipment according to the third embodiment.

FIG. 20 is a block diagram showing a hierarchical structure of software of the DTV equipment.

In the figure, reference numeral 151 designates hardware of the DTV equipment, and reference numeral 152 designates a real time OS section for processing various kinds of control information and data for controlling the hardware of the DTV equipment. Reference numeral 153 designates a command API section for passing a control command received as a command code line to the real time OS section 152. Reference numeral 154 designates a module providing GUI's for the DTV equipment, and reference numeral 155 designates applications installed on the DTV equipment.

FIG. 21 and FIGS. 23 to 26 are diagrams useful in explaining the command menu system according to the present embodiment. FIG. 22 is a diagram showing the appearance of an infrared ray remote controller for operating the DTV equipment by the command menu system according to the present embodiment.

Reference numeral 201 designates a body of the remote controller. Reference numeral 202 designates an infrared ray-emitting port. Reference numeral 203 designates a track ball device, and reference numeral 204 designates an annular command mode button arranged around the track ball device 203. Reference numeral 205 designates an up-down button for volume control. Reference numeral 206 designates an up-down button for use in switching channels. Reference numeral 207 designates a mute button for temporarily stopping sound output. Reference numeral 208 designates an input switching button for switching input sources. Reference numeral 209 designates a 10-key button for directly inputting a channel or for use in applications. Reference numeral 210 designates a function button used for viewing data broadcast or for applications. Reference numeral 211 designates a color button which is also used for viewing data broadcast or for applications.

Figure 27:
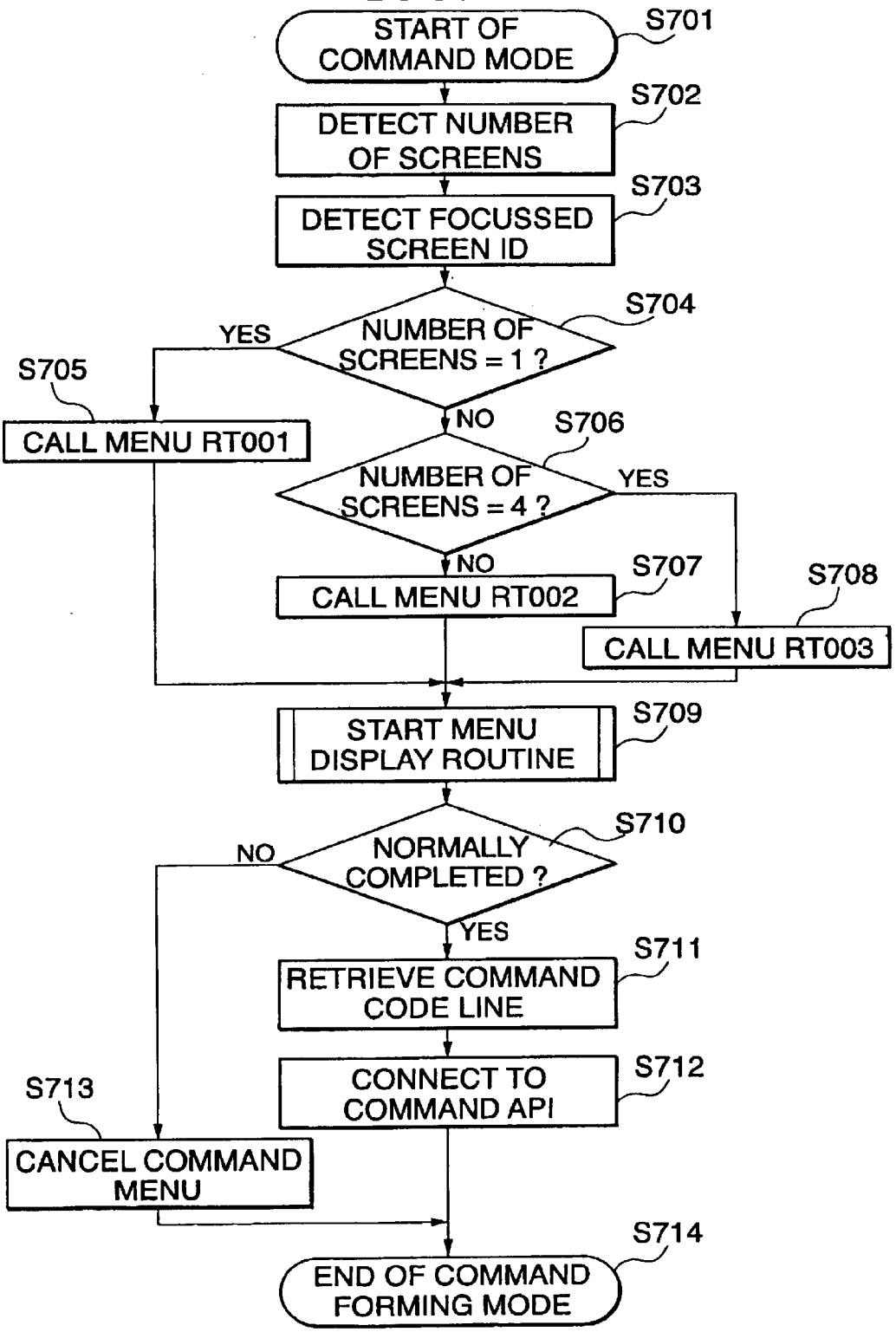
FIG. 27 is a flowchart showing a subroutine which is called in response to depression of a command mode button of the remote controller used by the FIG. 12 DTV equipment.

FIG. 27 is a flowchart showing a subroutine which is called in response to depression of the command mode button of the remote controller. It should be noted that if a program according to this flowchart is stored e.g. in the ROM 132, for execution, it is possible to implement the following control method.

At a step S701, the command mode is started, at a step S702, the number of screens displayed on the DTV equipment is detected, and at a step S703, the ID of a screen being currently focused is detected. Further, at a step S704, it is determined whether or not the number of screens is equal to one, at a step S705, table data of a menu ID RT001 is called, and at a step S706, it is determined whether or not the number of screens is equal to four.

Further, at a step S707, table data of a menu ID RT002 is called, at a step S708, table data of a menu ID RT003 is called, and at a step S709, a routine is started for starting to display a command menu. At a step S710, it is determined whether or not the command menu has been completed normally, at a step S711, a command code line is obtained from the command menu display routine normally terminated, at a step S712, the command code line obtained at the step S711 is sent to a command API section, and at a step S713, the command menu is canceled when the command menu display routine has been terminated abnormally.

FIGS. 28, 29, 30, and 31 are flowcharts showing a sequence of the whole operation of the command menu display routine in FIG. 27. It should be noted that if a program according to this flowchart is stored e.g. in the ROM 132, for execution, it is possible to implement the following control method.

Figure 28:
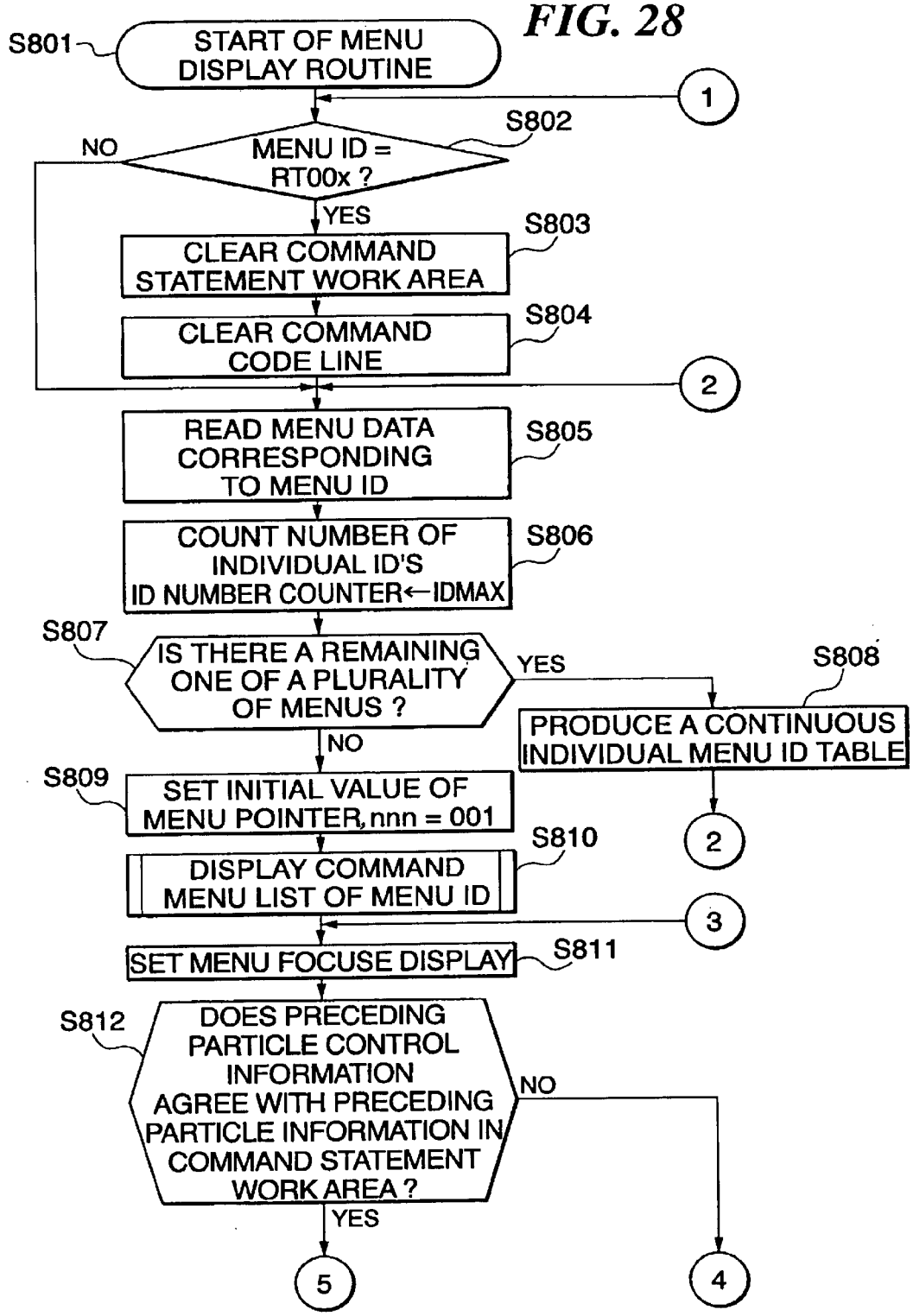
FIG. 28 is a flowchart showing a flow of an operation of a command menu display subroutine executed at a step of the FIG. 27 subroutine.
Figure 29:
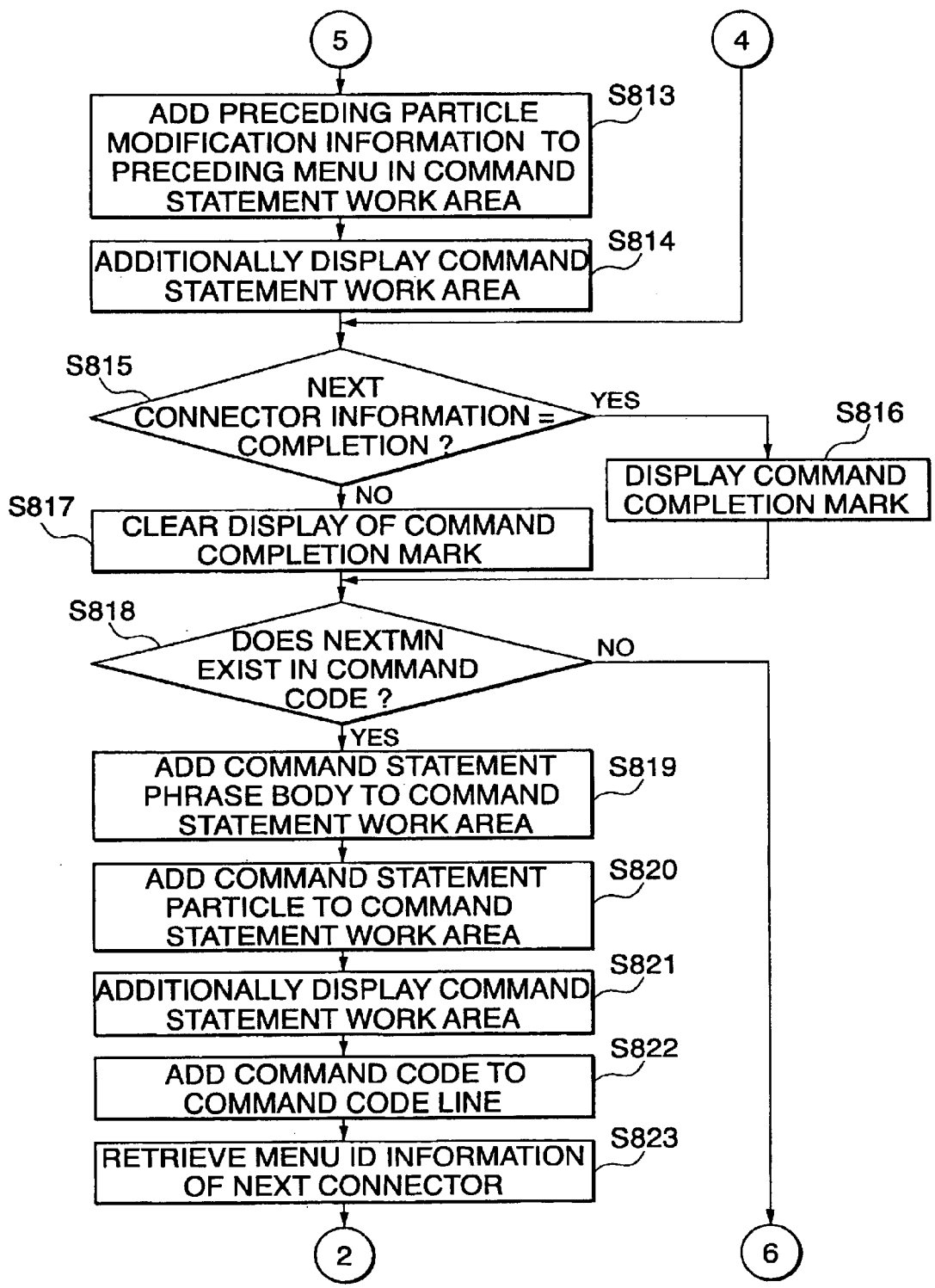
FIG. 29 is a flowchart showing a continued part of the flow of the operation of the FIG. 28 command menu display subroutine.

In FIGS. 28 and 29, at a step S801, the command menu display routine is started, at a step S802, it is determined whether or not a menu starting to be displayed is RT00x (x is an arbitrary numeral), at a step S803, a work area is cleared which provides a command statement accumulation area for sequentially displaying the command menu. Further, at a step S804, a command code line is cleared for accumulating command codes output from the command menu, at a step S805, data of menu data indicated by a specified menu ID is read, at a step S806, the number of menus having respective individual ID's in a menu having a menu ID is counted and the count value is stored in IDMAX.

At a step S807, it is determined whether or not there is a remaining menu when the display of a plurality of menus is indicated by the preceding menu, and at a step S808, a new menu table is produced which includes continuous individual ID's, from the plurality of menus. Further, at a step S809, a menu pointer indicative of a menu to be focused first out of the individual menus is initialized, at a step S810, individual menus in the menu instructed to be displayed are displayed on a screen in tabular list form, and at a step S811, one of the displayed menus which is coincident with the menu pointer is displayed in a focused manner.

Further, at a step S812, the particle information of the command statement phrase of the preceding menu stored in the command statement accumulation area is compared with preceding particle control information of the current menu to determine whether or not the former agrees with the latter, at a step S813, when the above particle of the preceding command statement phrase agrees with the preceding particle control information, preceding particle modification information is added to a portion in the command statement work area which corresponds to the particle of the preceding menu stored, thereby modifying the preceding particle.

At a step S814, the command statement work area is additionally displayed on the screen, at a step S815, it is determined whether or not the next connector information of the current menu option is "completion", at a step S816, a command completion mark indicative of completion of a command is displayed on the display screen when the command statement is completed, and at a step S817, the command completion mark is placed in a non-display state.

Further, at a step S818, it is determined whether table information of the selected menu option includes a code "NEXTMN" under the column of command codes thereof, at a step S819, for the command statement phrase body information of the selected menu option is added to the command statement work area, and at a step S820, the command statement particle information of the selected menu option is similarly added to the command statement work area. At a step S821, the command statement work area is additionally displayed on the screen, at a step S822, the command code of the selected menu option is added to the command code line, and at a step S823, the next connector information of the selected menu option is obtained.

Figure 30:
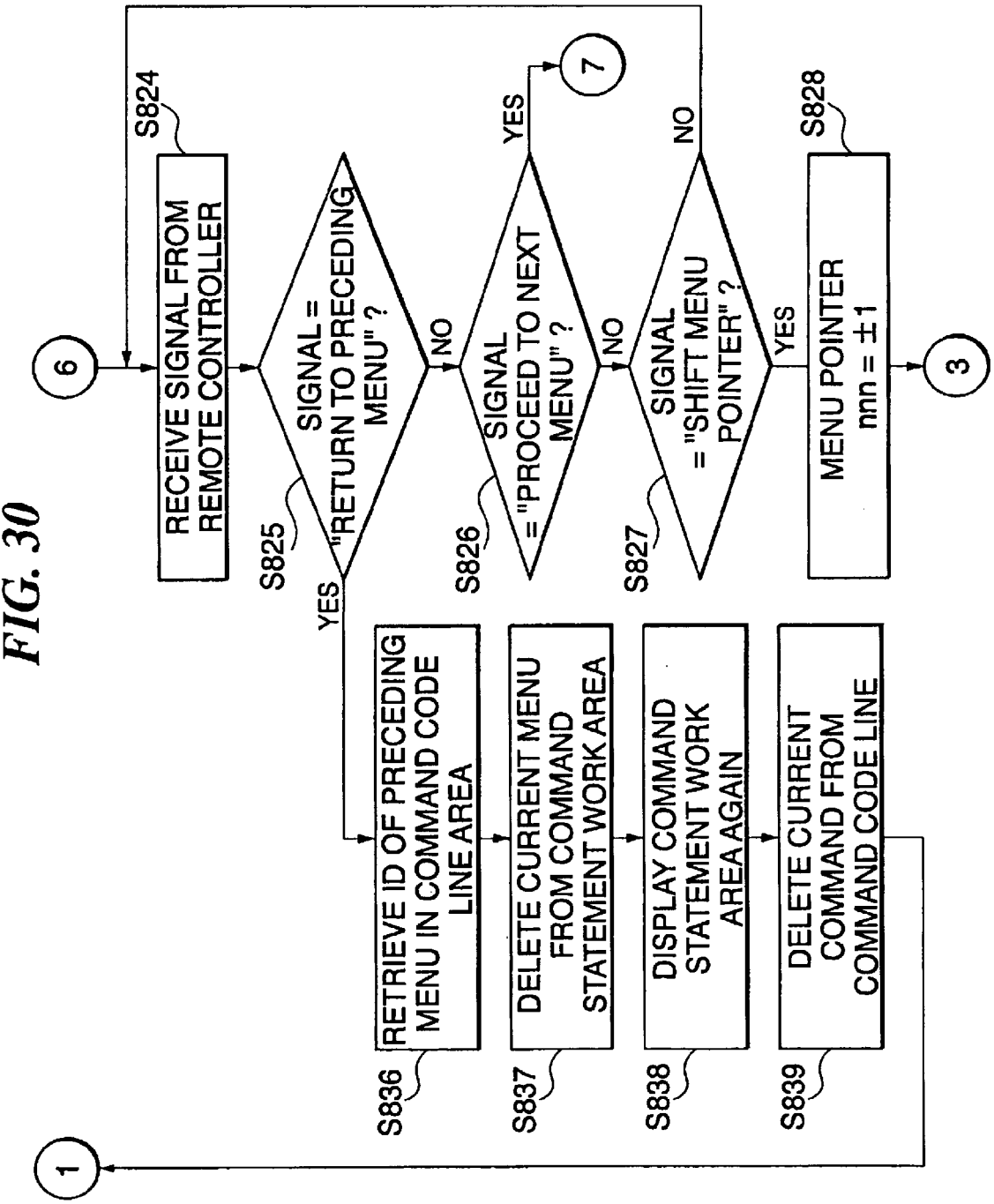
FIG. 30 is a flowchart showing a continued part of the flow of the operation of the FIG. 28 command menu display subroutine.
Figure 31:
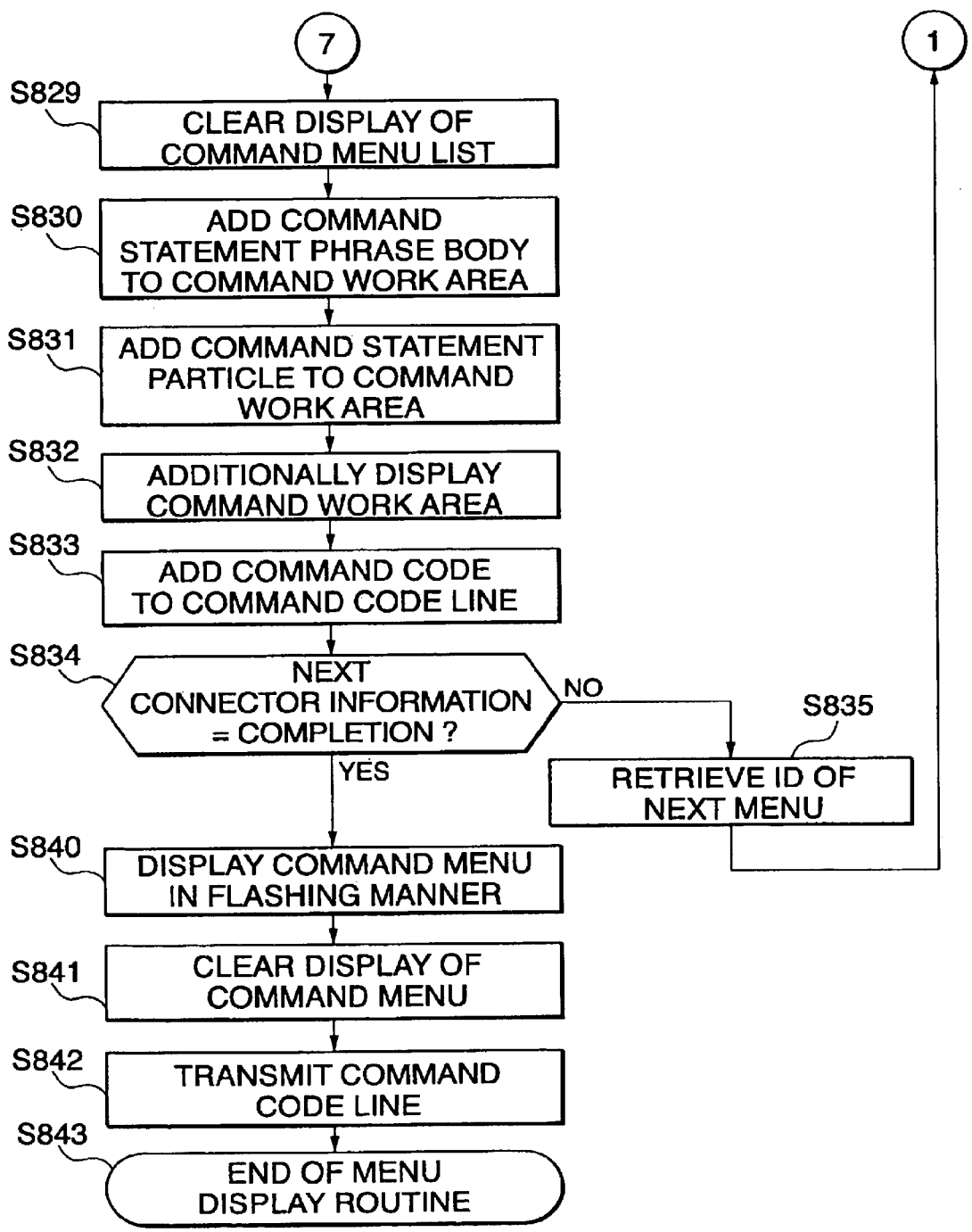
FIG. 31 is a flowchart showing a continued part of the flow of the operation of the FIG. 28 command menu display subroutine.

In FIGS. 30 and 31, at a step S824, a signal is received from the remote controller in a command menu mode, at a step S825, it is determined whether or not the received signal corresponds to a command "RETURN TO PRECEDING MENU", at a step S826, it is determined whether or not the received signal corresponds to a command "PROCEED TO NEXT MENU". Further, at a step S827, it is determined whether or not the received signal corresponds to a command "SHIFT MENU POINTER"(shift menu pointer to another individual menu), and at a step S828, the menu pointer is shifted in response to reception of the signal corresponding to the command "SHIFT MENU POINTER".

Further, at a step S829, the display of the individual menu list formed based on the current menu is placed in a non-display state, at a step S830, the command statement phrase body information of a selected individual menu is additionally stored in the command statement work area, at a step S831, the command statement particle information of the selected individual menu is additionally stored in the command statement work area similarly to the command statement phrase body information, and at a step S832, the information stored in the command statement work area additionally displayed on the screen.

At a step S833, the command code information of the selected individual menu is additionally stored in the command code line, at a step S834, it is determined whether or not the next connector information of the selected individual menu is indicative of "completion", and at a step S835, the ID of the next menu is obtained from the next connector information.

At a step S836, the ID of the preceding menu included in the command code line is obtained, at a step S837, a portion added by the current menu is deleted from the command statement stored in the command statement work area, at a step S838, the command statement information stored in the command statement work area is displayed again on the screen, at a step S839, the command code portion stored in the command code line and added by the current menu is deleted.

Further, at a step S840, the command statement of the command menu is displayed on the screen in a flashing manner, at a step S841, the command statement of the command menu displayed on the screen is placed in the non-display state, at a step S842, the command code stored in the command code line is sent out, and a step S843 indicates the termination point of the command menu display routine.

FIGS. 32 and 33 are diagrams which are useful in explaining a manner of change in the particle of the preceding menu option, which is caused through operation of the DTV equipment by the command menu system. FIG. 34 is a diagram which is useful in explaining a synthesized menu table which is produced by synthesizing a plurality of menus to generate serial synthesized menus ID's in place of redundant individual menus ID's when selection of a plurality of menu ID's is indicated by the preceding menu. FIG. 35 is a diagram useful in explaining an example of the command code line.

In the following, the present embodiment will be described in detail with reference to FIGS. 11 to 35.

Now, in FIG. 11, a plurality of child screens 102, 103 and 106 generated by the image synthesis section 130 are displayed on the monitor 131 as the display screen of the DTV equipment. On each of the screens are displayed several program data separated by the TS decoder circuit 124, and video data input from external devices connected to the DTV equipment via a high-speed digital I/F, for instance.

Out of the plurality of child screens, the child screen 106 on which information of TV3 is currently being displayed has a frame thereof displayed in a highlighted manner by the multi-screen GUI function of a TV application, which is one of the several applications 129 installed on the DTV equipment, for notifying the operator of the child screen 106 being focused.

In this state, when the focused child screen 106 is in a normal viewing state in which no command menu is displayed, by operating the track ball 203 of the FIG. 22 remote controller in one of upward, downward, leftward and rightward directions, it is possible to shift the focus to a child screen in the direction of operation of the track ball 203 such that simultaneously with the shift of the focus, a sound signal output from the body of the DTV equipment is switched to a signal from the focused child screen.

In the above normal viewing state, the command menu of the present embodiment starts to be displayed by depressing the command mode button 204 of the remote controller. It should be noted that a construction for receiving digital broadcast and a construction for implementing a multi-window of the DTV equipment have no direct relationship with the present invention, and hence description thereof is omitted. Further, in FIG. 21 et. seq., for further simplicity, the description will be given assuming that the display screen is formed not by multiple screens but by a single screen, for instance. In this case, it is assumed that even when multiple screens are displayed, so far as a focused screen is concerned, a command menu is displayed at a lower end of the focused screen.

Figure 21:
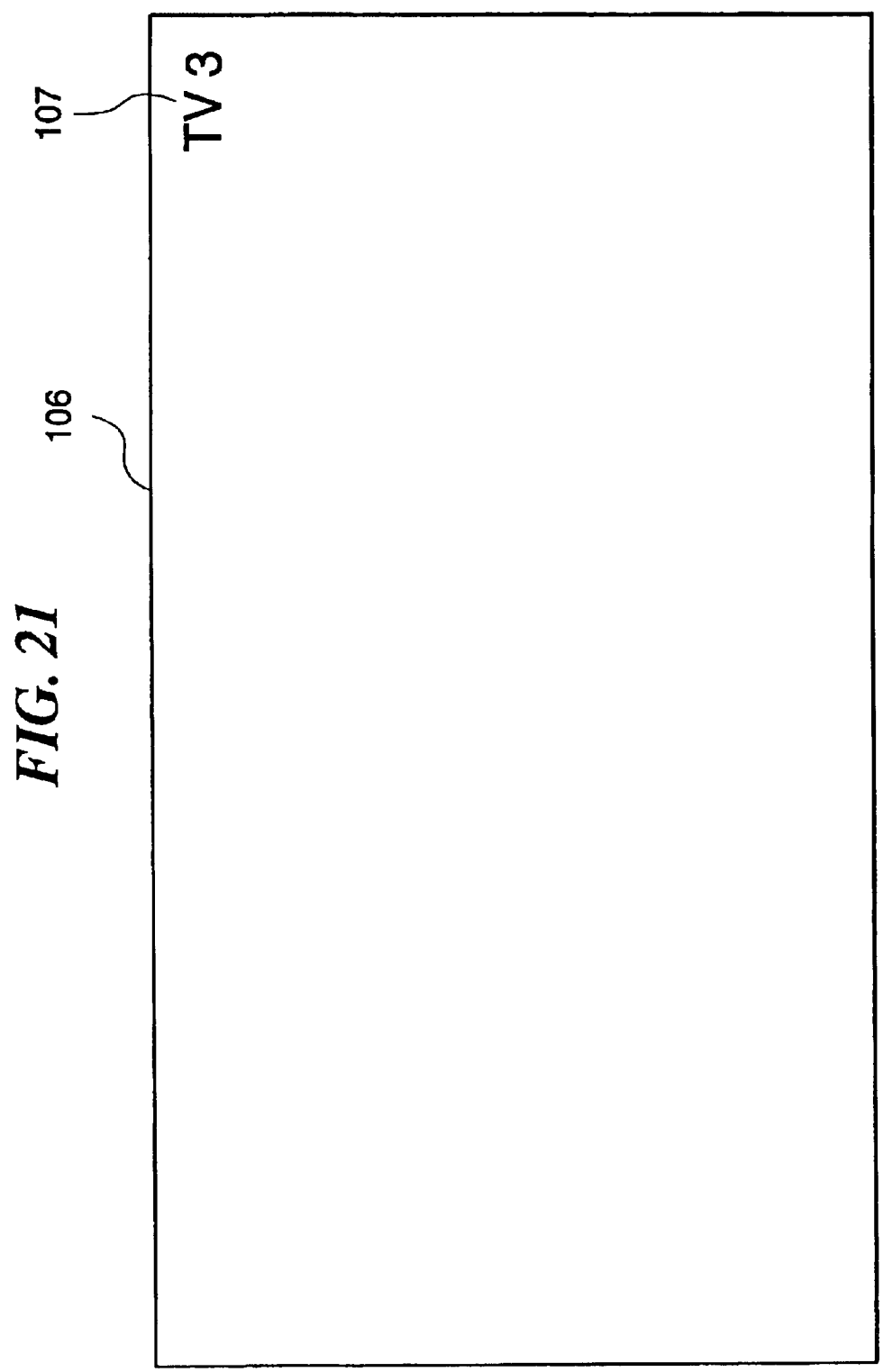
FIG. 21 is a diagram showing a screen view of the display screen, which is useful in explaining the command menu system employed by the FIG. 12 DTV equipment.
Figure 22:
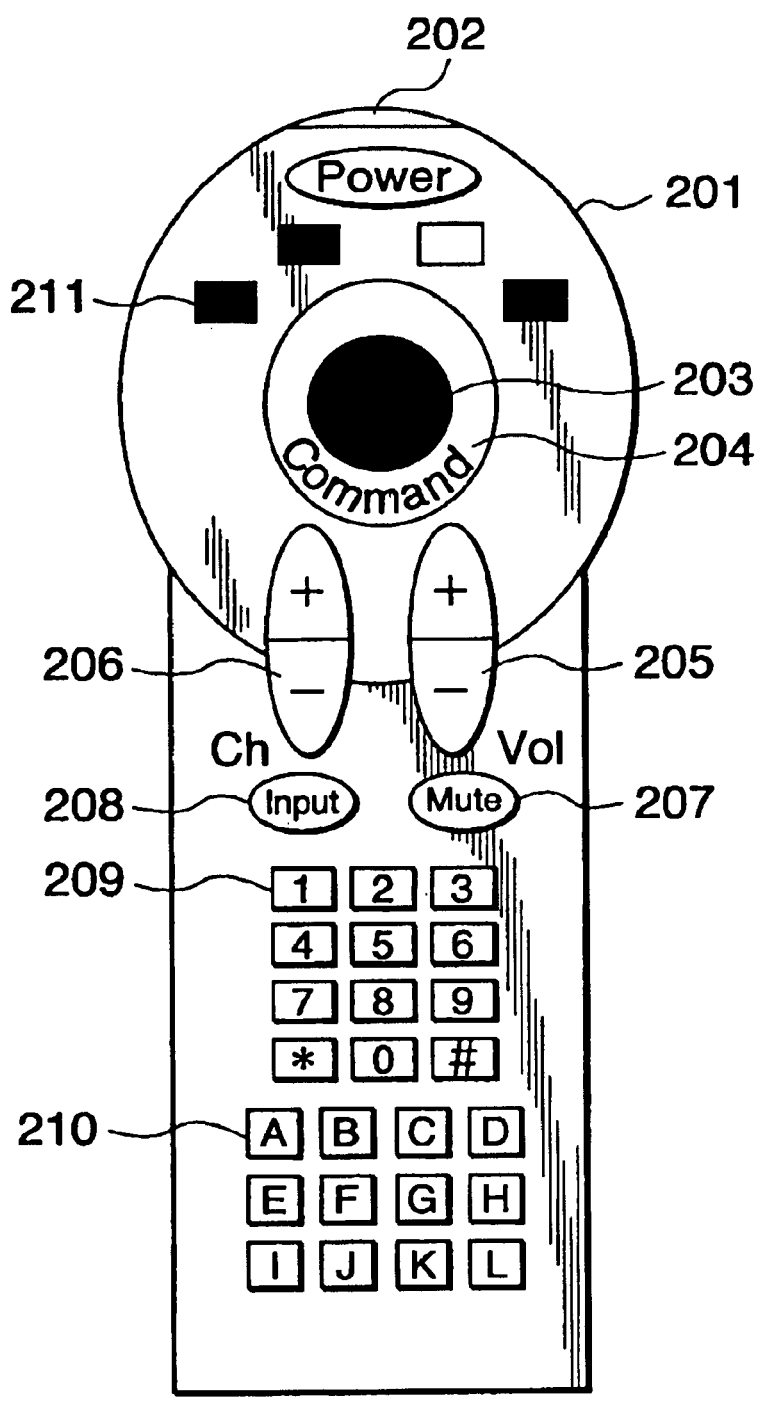
FIG. 22 is a diagram showing the appearance of an example of an infrared ray remote controller for operating the FIG. 12 DTV equipment by the command menu system employed thereby.

FIG. 21 is a diagram showing a screen view of the display screen 106 of the DTV equipment, that is, a normal screen view on which a video image, not shown, of a broadcast program on a channel 3 (TV3) is displayed. At this time, on a top right portion of the screen, supplementary information 107 is displayed by the OSD display circuit 128 and the image synthesis section 130.

Figure 23:
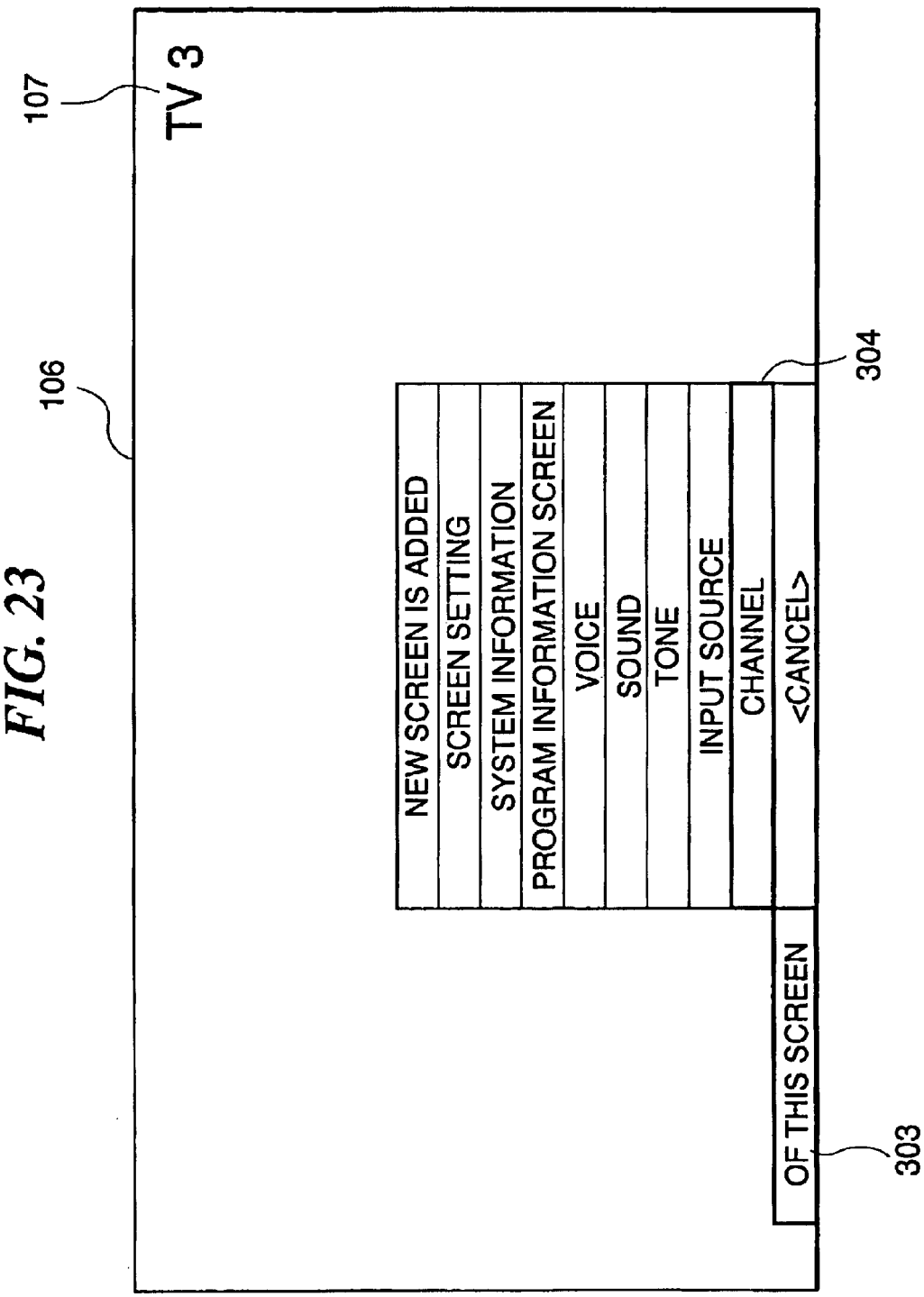
FIG. 23 is a diagram which is useful in explaining the command menu system employed by the FIG. 12 DTV equipment.

In this state of the supplementary information 107 being displayed, as shown in FIG. 23, the command menu according to the present embodiment is displayed by depressing the command mode button 204 of the remote controller. At this time, simultaneously with the display, an operation is started of which the flow after the start of the command mode is shown in FIG. 27. Here, immediately after the command button 204 is depressed, the number of the screens is detected at the step S702, and at the next step S703, the ID of the focused screen is detected.

Now, in the case of the example illustrated in FIG. 23, the number of the screens is equal to one, and hence, the menu ID RT001 is called at the step S705, and the command menu display routine is started at the step S709. At this time, if child screens have already been displayed, and the number thereof is equal to two or three, the menu ID RT002 is called at the step S707. Further, if there exist four screens at the step S706, that is, if the number of the screens is equal to the maximum number of screens for the DTV equipment employed in the present embodiment, the program proceeds to the step S708 for calling the menu ID RT003.

When the menu display routine shown in FIGS. 28, 29, 30, and 31 are started, first, at the step S802, a first menu ID is checked, and it is determined whether or not an argument of the checked menu ID is equal to RT00x (x is an arbitrary numeral), that is, whether or not the checked menu ID indicates the first menu of the command menu.

Here, since the called menu ID is RT001, the program proceeds to the step S803, wherein the command statement work area which serves as a work area when a command statement is constructed is cleared for initialization. Similarly, at the step S804, the command code line for constructing a command code is also cleared for initialization.

Next, at the step S805, the data table for the called menu ID is read in. FIG. 13 shows a data table of information of the menu ID RT001, which indicates that the menu contains only one individual menu option.

At the step S806, the number of ID's of individual menus is counted. In this example, the number of the individual menus in the menu ID RT001, i.e. 1 is stored in the ID number counter IDMAX. At the step S807, it is determined whether or not a plurality of menus are called and there is a remaining menu, and when only RT001 is called, the menu pointer is set to an initial value 1 to indicate a first menu to be focused. At the step S810, data of the command statement phrase body and command statement particle existing in the individual menu in the menu ID is displayed as a list. At the step S811, a menu option indicated by the menu pointer is focused to display in highlighted manner the frame of the command statement phrase in the focused menu option. In this example, since the menu ID RT001 contains only one menu option, so that as shown by reference numeral 303 in FIG. 23, portions "THIS SCREEN" and "OF" are displayed.

Next, at the step S812, it is determined whether or not the command statement particle agrees with the preceding particle information in the command statement work area. In the present state, the command statement work area remains in the initialized state, so that the program proceeds to the step S815, wherein it is determined whether or not next connector information contained as an item of the data table for the focused menu option indicates "completion". In the present case, the answer to this question is negative, so that the program proceeds to the step S817.

At the step S817, if the command completion mark has been displayed, the mark is placed in a non-display state, and at the next step S818, it is determined whether or not the data table contains the code "NEXTMN" in the column of the command code. In the case of the menu ID RT001, the code "NEXTMN" is included as a command code, and hence at the steps S819 and 820, the contents under the columns of the command statement phrase body and command statement particle of the data table are additionally written in the command statement work area. Similarly, at the step S822, the contents of the command code are additionally written in the command code line. Then, at the step S823, information of the column of the next connector (menu ID) i.e. "GN001" and "NW001", is retrieved, followed by the program returning to the step S802.

In this case, since the menu ID is not RT00x (x is an arbitrary numeral), the program proceeds from the step S802 to the step S805, wherein out of the menu tables of GN001 and NW001 shown in FIG. 14 and FIG. 15, respectively, information of the first next connector information GN001 is first read in. At the next step S806, the number of the individual menus of GN001 is counted, and at the step S807, it is determined whether or not there is a remaining menu. In this case, the answer to this question is affirmative so that, the program proceeds to the step S808, wherein a new menu table, as shown in FIG. 35, for a synthesized menu is produced. Thereafter, the program returns to the step S805 again to read in a menu table for NW001 this time.

At the step S806, the number of the individual menus of NW001 is added to IDMAX in addition to the number of individual menus of GN001, and at the step S809, the menu pointer indicative of a first menu option to be focused is initialized. At the next step S810, all the individual menus in the synthesized menu are displayed as a list for comparison with the preceding particle information in the command statement work area, and if they do not agree with each other, the program proceeds to the step S815.

At the step S815, the next connector information is checked. The next connector information does not yet indicate "completion", so that at the step S817, the command completion mark is placed in a non-display state, if the mark is displayed, and the program proceeds to the step S818, wherein it is determined whether or not the code "NEXTMN" exists in the column of command code of the data table for the focused individual menu. The code "NEXTMN" is not in the data table of the focused individual menu in the synthesized menu, and hence, at the step S824, a signal from the remote controller is awaited. FIG. 23 shows this wait state. More specifically, when the command menu according to the present embodiment is started by depressing the command button first from the state of FIG. 21, the child screen is shifted immediately to the state of FIG. 23.

At the next step S825, it is determined whether or not the signal from the remote controller is instructing "RETURN TO PRECEDING MENU" to carry out the above selection and determination again, that is, the track ball 203 was operated in the leftward direction. Here, to continue operation of the command menu, the program proceeds to the step S826, wherein it is determined whether or not the signal from the remote controller is instructing "PROCEED TO NEXT MENU" to select the individual menu focused at the present time point and to cause the program to proceed to the next menu, that is, the track ball 203 was operated in the rightward direction. Then, the program proceeds to the step S829. At this time, when the option of the individual menu focused at the present time point is not one desired by the user, the track ball 203 may be operated in the upward or downward direction so that the answer to the question of the step S827 becomes affirmative. Then, at the step S828, the value of the menu pointer indicating the focused menu option is increased or decreased in a manner corresponding to the upward or downward operation of the track ball 203. Then, the program proceeds to the step S811, wherein the focused position is shifted.

By repeatedly carrying out the steps S812 to S828, it is possible to shift the focus on a menu option designated by reference numeral 304 in FIG. 23 to another menu option, whereby the operator can select a desired menu option from individual menus displayed in the menu option list.

Now, let it be assumed that after the above selection, in the state of FIG. 23, the operator selects the menu option "CHANNEL" 304 from the menu option list. Further, in the above state, if the operator operates the track ball 203 of the remote controller in the rightward direction so as to finally determine the selection of the menu option, the signal from the remote controller is received at the step S824, and depending on the determination at the step S826, the program proceeds to step S829.

At the step S829, similarly to the above, the menu option list portion including "CHANNEL" in FIG. 23, of the command menu is placed in a non-display state, and at the steps S830 and S831, the information of the menu option selected from the synthesized menu table, and the information of the items of the command statement phrase body and the command statement particle of a synthesized menu ID 001 is additionally stored in the command statement work area. Further, at the step S832, the contents of the command statement work area are additionally displayed on the screen, and at the step S833, information in the column of the command code of the synthesized menu table is added to the command code line. Next, at the step S834, it is determined whether or not the next connector information indicates "completion". In the case of the menu option selected above, the program proceeds to the step S835, wherein the ID of the next menu is obtained from the next connector information. Similarly, in the following, the program proceeds to the step S802, the step S805, the step S806, and the step S807. Since the next menu information obtained at the above steps indicates only one menu ID, the program proceeds to the step S809.

Next, at the step S810, the information of the command statement phrase body and command statement particle in the FIG. 18 menu ID table for the obtained menu ID is displayed as a command menu list. Then, at the step S811, a menu option for an individual menu ID 001 is displayed in a focused manner by the menu pointer having the initial value set thereto.

At the next step S812, the preceding particle control information of the menu option is compared with the preceding particle information in the command statement work area, and in this case, the program proceeds to the step S815. At this time, the next controller information of the individual menu ID 001 indicates "completion", so that the program proceeds to the step S816, wherein "command completion mark" is displayed which indicates completion of inputting of the command by the command menu system for execution of the command after selection of the menu option.

Figure 24:
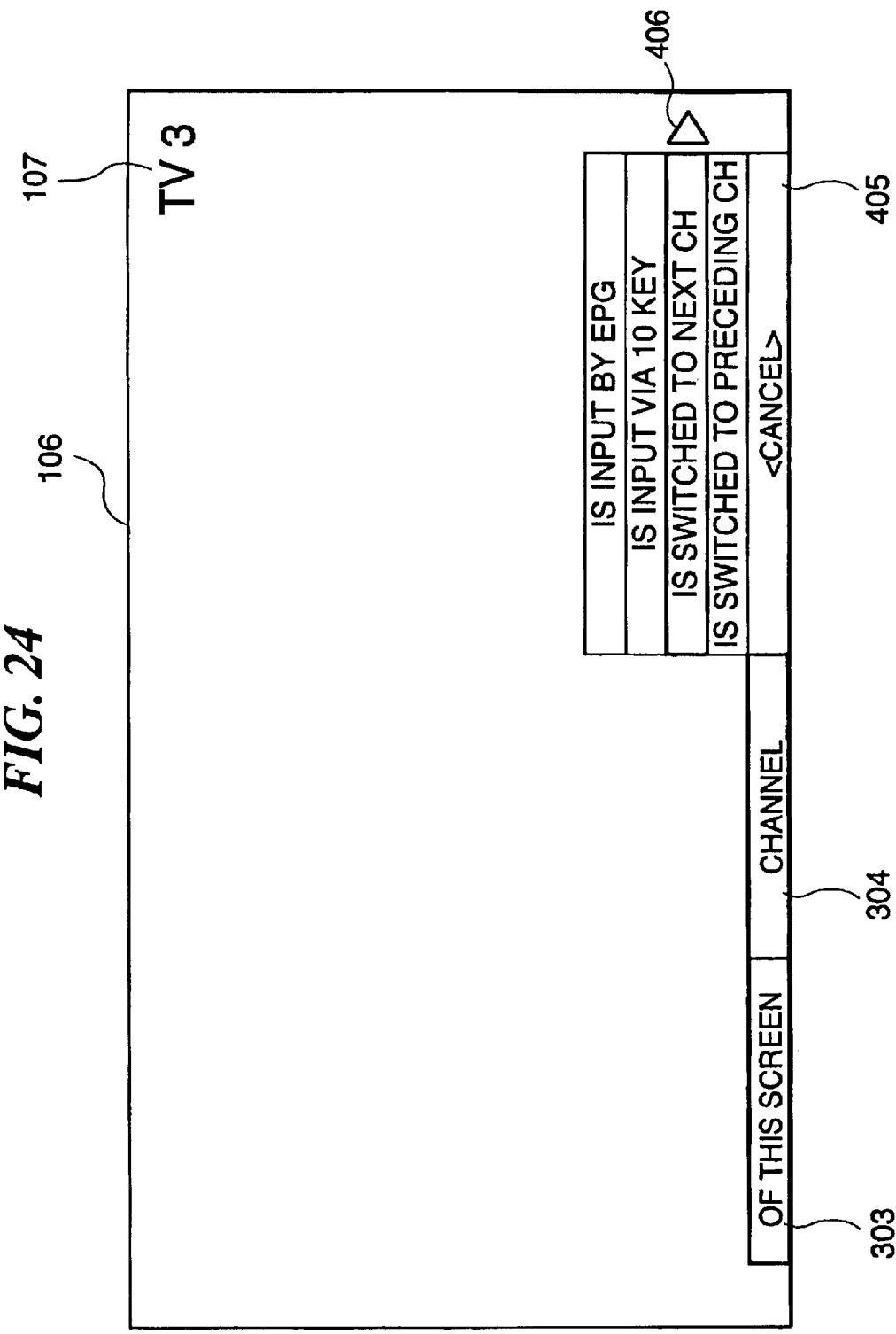
FIG. 24 is a diagram which is useful in explaining the command menu system employed by the FIG. 12 DTV equipment.

At the next step S818, information of the command code for the menu option is checked, and at the next step S824, a signal from the remote controller is awaited. In the present case, it is assumed that at this step S824, the signal of "SHIFT MENU POINTER" is received, and at the step S827, determination of the received signal is performed. At the next step S828, the menu pointer is shifted. As a result, an individual menu ID 002 is selected from the menu, and at the step S811, the individual menu ID 002 is displayed in a focused manner. Then, after determination at the step S812 is carried out, at the step S816, similarly to the above, the command completion mark is displayed for a corresponding menu in the command menu. Thereafter, information of the command code of the menu option is checked at the step S818, and at the step S824, the program is placed in a signal reception wait state. FIG. 24 shows the above signal reception wait state. In the figure, a focused menu option "IS SWITCHED TO NEXT CH" in a menu option list designated by reference numeral 405 has the completion mark displayed at a right-side end thereof.

In the above signal reception wait state, when the operator operates the track ball 203 of the remote controller in the rightward direction, to "PROCEED TO NEXT NEMU", which is detected at the step S826, the program proceeds to the step S829. At the step S830 and the step S831, the command statement phrase body and command statement particle of the selected menu option are added to the command statement work area. Similarly, the command code is added to the command code line and at the step S834, it is determined whether or not the next connector information of the selected menu option is indicative of "completion", and in this case, the answer to this question is affirmative, so that the program proceeds to the step S840.

Figure 25:
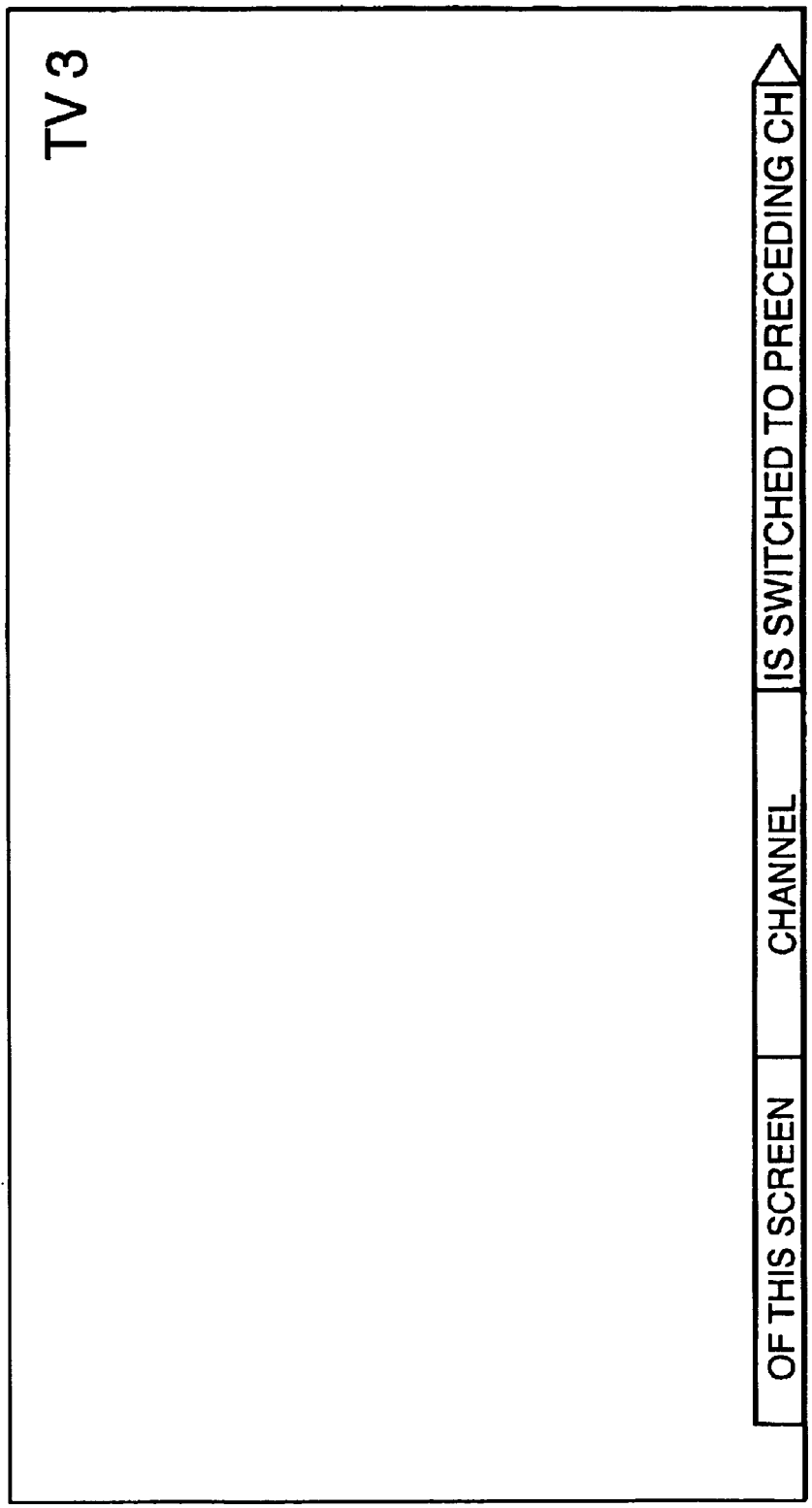
FIG. 25 is a diagram which is useful in explaining the command menu system employed by the FIG. 12 DTV equipment.
Figure 26:
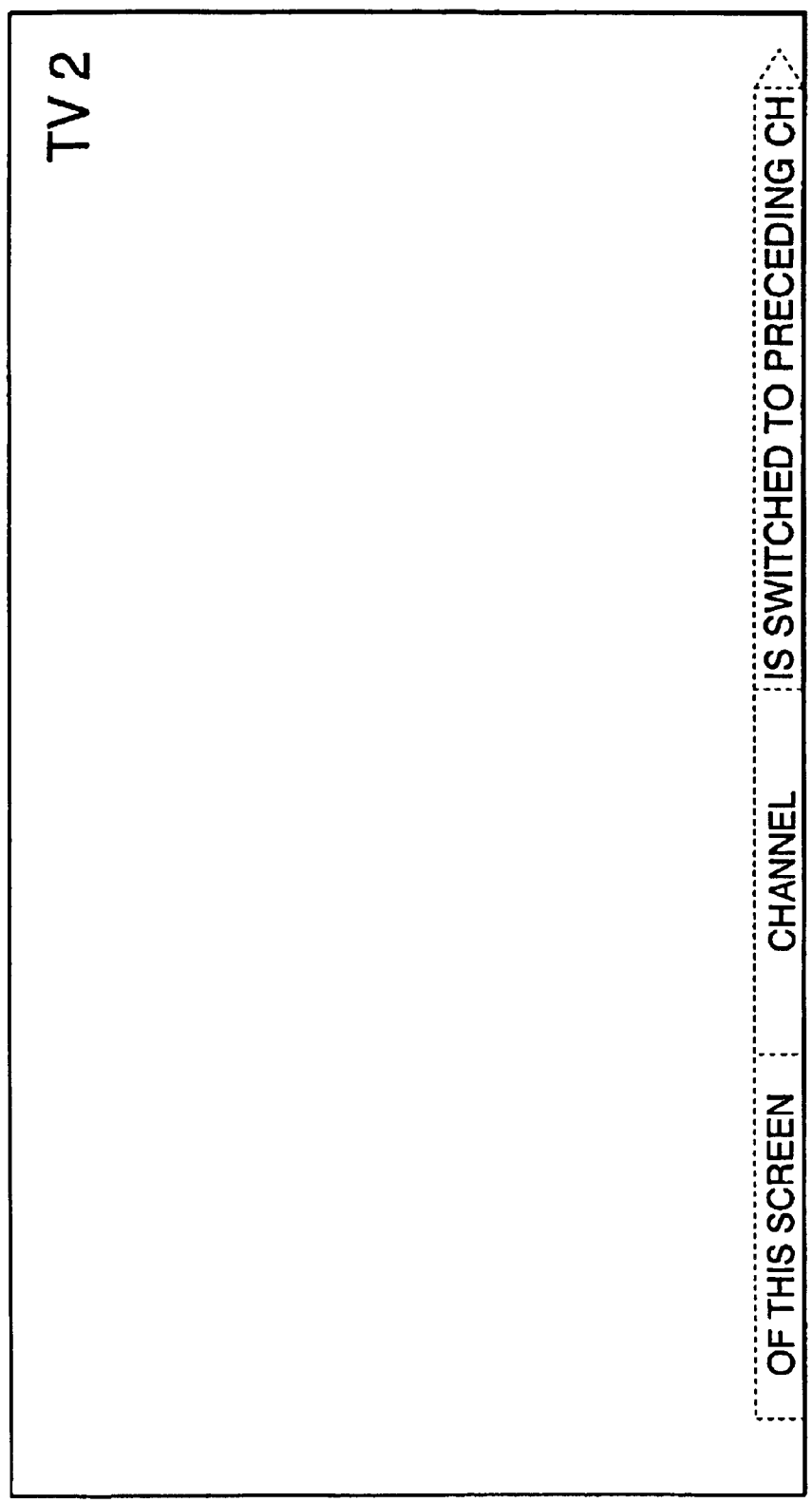
FIG. 26 is a diagram which is useful in explaining the command menu system employed by the FIG. 12 DTV equipment.

At the step S840, a line of completed command statement shown in FIG. 25 is repeatedly displayed in a flashing manner by switching the display and non-display of the command statement at short time intervals. Thereafter, at the step S841, the display of the command statement is cleared, and at the step S842, data in a completed command code line shown in FIG. 35 is transmitted from the GUI module 154 to the command API module 153 as data representative of a user's operation of the DTV equipment, whereby as shown in FIG. 26, the channel is switched from channel 3 to channel 2.

At this time, when a command statement is to be created by the menu command method, if the operator designates a menu option of "SYSTEM INFORMATION" designated by reference numeral 914 in FIG. 33 to select the same, from a state shown in FIG. 32 in which "VOICE" 904 is selected as the next menu option following the phrase "OF THIS SCREEN" 903, the focus is reset at the step S811, and at the same time at the step S812, it is determined whether or not information of "OF" of the preceding particle control information "OF→ON" of the synthesized menu information in FIG. 34, included in the menu option, agrees with the portion "OF" of "OF THIS SCREEN", i.e. the command statement phrase of the preceding menu option stored in the command statement work area. As a result, it is determined that the former agrees with the latter, and the program proceeds to the step S813, wherein the command statement work area is modified such that the portion "OF" of the command statement phrase of the preceding menu option is prevented from being displayed on the screen, and "ON" is placed before "THIS SCREEN". The modified command statement work area is displayed on the screen again at the step S814.

Although in the present embodiment, the track ball 203 is used as a pointing device of the remote controller by way of example, this is not limitative, but a joy stick device may be used in place of the track ball 203, and by operating an operation spindle of the joy stick device such that the operation spindle falls in eight or more directions to thereby deliver shift signals corresponding to the respective directions, or by depressing the operation spindle from a vertical direction for a transition to the command menu mode, it is possible to operate the DTV equipment in the same manner as when the track ball 203 is used. It goes without saying that the track ball 203 can be easily replaced by a track pad device, a cross cursor shift button, or other devices for use in pointing.

As described above, according to the present embodiment, when the operator wants to carry out some operation on the DTV equipment, he has only to depress the command button 204 of the remote controller on a desired screen, so that a transition to the command menu mode can be made instantaneously. Further, it is possible to dynamically select only a function executable in this situation as a menu command to display the function in list form.

Further, also when a desired menu is selected from a hierarchical set of menus while selecting parameters or the like in intermediate steps, only menus sequentially selected in the intermediate steps continue to be displayed constantly, and the other unselected menus cease to be displayed on the screen, which prevents the selecting operation from being made complicated or disordered, thereby making it possible to confirm or view selected menus as desired and in any steps.

Further, since the sequence of menu options produced by the command menu form a line of statement indicating the selected operation, it is possible to provide a simple and understandable command menu system which enables the operator to achieve his object to complete a command without being misled even if he operates a multifunctional DTV equipment.

[Fourth Embodiment]

In the above described third embodiment, a command menus is operated so that menu options are sequentially selected to produce command statements, and whenever a desired function is finally executed by each command statement thus produced, the command statement is deleted. In the present embodiment, arbitrary combinations of individual menu options that form command statements frequently used by the operator are registered in advance in the function button 210 of the FIG. 22 remote controller, under titles related to respective objects for which the operator operates the command menu.

Before the operator carries out the above registration, to produce a command statement of "OF THIS SCREEN", "INPUT SOURCE", "IS SWITCHED TO CHANNEL" "CH1" and "OF GROUND WAVES" by the command menu system, the following command codes are generated:

THSWIN (WIN00) [RT001], WINSRC [GN001+NW001], WINCHE [GN002], CHATEN (CHI) [CH001], GRNWAV [SR001]

Here, THSWIN designates a command code which is added when a command statement phrase "OF THIS SCREEN" is selected. The ID of a screen WIN00 focused at the present time point, and the ID of the menu used at the time point, of the command menu are displayed as arguments enclosed within respective parentheses ( ) and [].

Next, in WINSRC [GN001+NW001], WINSRC designates a command code which is added when a command statement phrase "INPUT SOURCE" is selected, and [GN001+NW001] designates an argument which is the ID of a synthesized menu formed by synthesizing menu ID's GN001 and NW001 when the phrase "INPUT SOURCE" is selected. The argument is expressed such that GN001 and NW001 are coupled by a symbol "+" to indicate that the two menu ID's are synthesized with each other. The command code WINCHE added when a phrase "IS SWITCHED TO CHANNEL" is selected has a dedicated menu ID GN002 for selection of a channel as an argument. The command code CHATEN added when a portion "CH1" is selected is written with an argument CHI for selection of Channel 1 and the menu ID CH001 for changing channels. Finally, GRNWAV which is a command code added when a phrase (command statement phrase) "OF GROUND WAVES" is selected has the menu ID SR001 for selection thereof, as an argument.

Now, the operator selects the phrase "OF THIS SCREEN" by the normal command menu system in order to register a combination of the portions of "INPUT SOURCE", "IS SWITCHED TO CHANNEL", "CH1", and "OF GROUND WAVES" of the above command statement, and then enters a registration mode. Then, the operator selects the combination of the portions of "INPUT SOURCE", "IS SWITCHED TO CHANNEL", "CH1", and "OF GROUND WAVES" by using the menu command, and terminates the registration mode, thus completing the registration. Further, in completing the registration, the operator can assign a desired registration title, such as "VIEW NEWS" or the like, to the command statement formed of the combination.

By carrying out the above operation, a new registered menu option can be added to the menu which can follow the phrase "OF THIS SCREEN" of the command statement.

FIG. 36 shows an example of a menu table to which an arbitrary lump of a command statement produced by operating the command menu is registered.

Respective items of a menu option registered in the menu table will be described. The menu ID of a newly registered menu option is the same as that of a first one (at a highest hierarchical level) of a combination of original menu options (at respective hierarchical levels) which the newly registered menu option represents, and for all menus (menu tables) with which the original menu options are registered respectively, the same registration is effected by using the same menu ID.

The individual menu ID of the newly registered menu option is a serial number newly added to the individual menu ID's belonging to the menu. As to preceding particle control information, although preceding particle control information is at first set to the same as that of the first command statement phrase in the newly registered portion of the command menu, it is required that the preceding particle control information can be otherwise edited depending on a title, described hereinafter, newly registered to the items of the command statement phrase body and the command statement particle. For instance, when a new title "VIEW NEWS" is registered to the item of the command statement phrase body as a newly registered title of the registered command menu option, if the command statement phrase "VIEW NEWS" is placed immediately after the portion "OF THIS SCREEN", the portion "OF THIS SCREEN" should be changed to "ON THIS SCREEN". Therefore, in this case, the DTV equipment is required to incorporate input means for inputting preceding particle control information "OF→ON".

Further, in this case, it is possible to omit the item of command statement particle since the next connector information "completion" of the last phrase of the newly registered command statement is registered to the item of next connector information.

As the command codes of the newly registered command statement, command codes corresponding to a command statement starting with the above command statement phrase "INPUT SOURCE" are registered as follows:

WINSRC [GN001+NW001], WINCHE [GN002], CHATEN (CHI) [CH001], GRNWAV [SR001]

Such a construction of the remaining portion of the command code line enables the operator to select the option "VIEW NEWS" from any option on the menu, such as "OF THIS SCREEN", "NEW SCREEN IS ADDED", and "CHILD SCREEN, which is configured such that it can be followed by the phrase "INPUT SOURCE.

Further, although in the present embodiment, in registration of a command statement by the command menu system, such a command statement is registered as includes an intermediate phrase to the last command completion point thereof, this is not limitative, but such a command statement may be further registered as includes from the first phrase to an intermediate phrase such that desired phrases can be selected from the command menu to be arranged forward and backward of the registered portion.

According to the present embodiment described above, a command statement frequently used by the operator can be registered with a title understandable to him. Moreover, it is possible to select usable phrases from the command menu to connect them as desired to front and rear ends of the command statement. This makes it possible to obtain a highly adaptable and user-friendly command menu system.

Further, if the title of a command statement is registered in association with the user's object, a command menu can be obtained which is not only capable of operating the functions of the DTV equipment, but also is readily understandable to an unskilled operator. This makes it possible to provide an operational environment that facilitates implementing advanced functions of the DTV equipment.

[Fifth Embodiment]

In the above fourth embodiment, in registering a desired command statement phrase, the command statement phrase is registered by wholly substituting "registration preceding particle control information", "registration title portion", and "registration title particle", each of which is newly input and registered by the operator, for the "preceding particle control information", "command statement phrase body" and "command statement particle portion" of the menu table already registered. In the fifth embodiment, however, the above menu table is provided with new items of "registered command statement preceding particle control information", "registered title portion" and "registered title particle" for storing respective information items newly input and registered by the operator in the same manner as described above in the fourth embodiment. Further, as the existing items of "preceding particle control information", "command statement phrase body" and "command statement particle" of the menu table, the following are registered: the preceding particle control information of the first phrase of a command statement formed by a plurality of command statement phrases connected to each other, a command statement portion of the command statement phrase from which is excluded a particle of the last statement phrase of the command statement phrase formed by the plurality of command statement phrases connected to each other, and finally the particle of the last statement phrase of the command statement phrase formed by the plurality of command statement phrases connected to each other.

Further, a display means is provided which, when the operator actually operates the command menu to form a command statement, is capable of alternately displaying command statement phrase bodies and respective command statement particles associated therewith from information of a table for a corresponding menu, and command statement phrase bodies and command statement particles associated therewith, formed by using the information of the newly-added "registered command statement preceding particle control information", "registered title portion" and "registered title particle", which makes it possible to display a proper command statement created by the command menu system, which describes the functions and operations of the DTV equipment in detail, even when selection of command codes is carried out by using a simplified registered title. Therefore, even if there is a menu option registered by using a vague title, a genuine function associated with the menu option is displayed in the form of a command statement, whereby it is possible to provide a reliable and understandable command menu system.

The present invention is not limited to the devices according to above embodiments, but it may be applied to a system comprised of a plurality of devices, or an apparatus formed of one device. It goes without saying that the object of the present invention may be accomplished by supplying a computer-readable storage medium in which is stored a software program realizing the functions of the above-mentioned embodiments to a system or apparatus, and causing a computer (CPU or MPU) of the system or apparatus to read out and execute the program stored in the storage medium.

In this case, the code of the program itself read out from the storage medium achieves the functions of the above embodiments, and the storage medium storing the program constitutes the present invention. The computer-readable storage medium for supplying the program to the system or apparatus may be in the form of a floppy disk, a hard disk, an optical memory disk, an magneto-optical disk, a CD-ROM, a CD-R (CD-Recordable), a magnetic tape, a nonvolatile memory card, or a ROM, for instance.

Further, needless to say, not only the functions of the above embodiments can be realized by carrying out the program read out by the computer but also an OS (operating system) or the like operating on the computer carries out part or whole of actual processing in response to the instruction of the code of the program, thereby making it possible to implement the functions of the above embodiments.

Furthermore, it goes without saying that after the code of the program read out from the storage medium has been written in a memory incorporated in a function extension board inserted into the computer or in a function extension unit connected to the computer, a CPU or the like arranged in the function extension board or the function extension unit carries out part or whole of actual processing in response to the instruction of the code of the next program, thereby making it possible to achieve the functions of the above embodiments.

What is claimed is:

1. An image display apparatus having menus of a plurality of hierarchical levels, the image display apparatus including menu display means for displaying menu data set to each hierarchical level of the menus in a screen display area;

wherein said menu display means displays the menu data such that a plurality of items of the menu data are displayed for at least one hierarchical level, and wherein the menu display means comprises:

individual display width detection means for detecting a display width of each item of the menu data;

total display width detection means for detecting a total display width required for displaying menu data to be displayed in the screen display area;

comparison means for comparing the total display width with an area width of the screen display area; and display control means that, when new menu data at another hierarchical level are to be displayed in addition to menu data at least one hierarchical level already displayed, detects the total display width of the menu data to be displayed including the new menu data, and if the detected total display width is larger than the area width of the screen display area, carries out a replacement process for replacing a plurality of items of the menu data at one of the at least one hierarchical level already displayed, with other menu data set to the one of the hierarchical levels, and then displays the resulting menu data in the screen display area.

2. An image display apparatus according to claim 1, wherein the replacement process is repeatedly carried out at each hierarchical level until the total display width becomes smaller than the area width of the screen display area.

3. An image display apparatus according to claim 2, including storage control means for carrying out, at each of a plurality of hierarchical levels already displayed, a process for storing a value of the total display width and a combination of items of the menu data at the plurality of hierarchical levels already displayed, whenever the total display width has become smaller than the area width of the screen display area through the replacement process, and extraction means for extracting one of stored combinations of the items of the menu data that has the maximum value of the total display width, wherein said display control means displays the new menu data at the another hierarchical level together with the menu data at respective hierarchical levels in the combination extracted by said extraction means, in the screen display area.

4. An image display apparatus according to any one of claims 1 to 3, wherein the menu data comprises image data.

5. An image display apparatus according to any one of claims 1 to 3, wherein the menu data comprises at least one character code, the character code being converted to image data by using menu display font data, said menu display means displaying the image data as a menu.

6. An image display apparatus according to claim 5, having a WWW browser function, and wherein font data of the WWW browser is used as the menu display font data.

7. An image display apparatus according to any one of claims 1 to 3, including input means capable of controlling said menu display means from outside of the image display apparatus.

8. An image display method for an image display apparatus, for displaying menu data set to each of a plurality of hierarchical levels of menus in a screen display area;

the image display method comprising the steps of:

setting a plurality of items of the menu data to at least one hierarchical level;

detecting a display width of each item of the menu data;

detecting, when new menu data at another hierarchical level are to be displayed in addition to menu data at least one hierarchical level already displayed, a total display width required for displaying the menu data to be displayed including the new menu data;

comparing the total display width with an area width of the screen display area;

carrying out a replacement process for replacing a plurality of items of the menu data at one of the at least one hierarchical level already displayed, with other menu data set to the one of the hierarchical levels, if the detected total display width is larger than the area width of the screen display area; and displaying the menu data in the screen display area.

9. An image display method according to claim 8, wherein the replacement process includes repeatedly carrying out at each hierarchical level until the total display width becomes smaller than the area width of the screen display area.

10. An image display method according to claim 9, further including the steps of:

carrying out, at each of a plurality of hierarchical levels already displayed, a process for storing a value of the total display width and a combination of items of the menu data at the plurality of hierarchical levels already displayed, whenever the total display width has become smaller than the area width of the screen display area through the replacement process; and extracting one of stored combinations of the items of the menu data that has the maximum value of the total display width, and wherein the step of displaying the menu data includes displaying the new menu data at the another hierarchical level together with the menu data at respective hierarchical levels in the combination extracted by the step of extracting the one combination, in the screen display area.

11. An image display method according to any one of claims 8 to 10, wherein the menu data comprises image data.

12. An image display method according to any one of claims 8 to 10, wherein the menu data comprises at least one character code, wherein the step of displaying the menu data includes converting the character code to image data by using menu display font data, and displaying the image data as a menu.

13. An image display method according to claim 12, wherein the image display apparatus has a WWW browser function, and wherein font data of the WWW browser is used as the menu display font data.

14. An image display method according to any one of claims 8 to 10, including the step of controlling the displaying of the menus from outside of the image display apparatus.

15. An image display system including at least one image display apparatus, wherein said image display apparatus having menus of a plurality of hierarchical levels, the image display apparatus including menu display means for displaying menu data set to each hierarchical level of the menus in a screen display area;

wherein said menu display means displays the menu data such that a plurality of items of the menu data are displayed for at least one hierarchical level, and wherein the menu display means comprises:

individual display width detection means for detecting a display width of each item of the menu data;

total display width detection means for detecting a total display width required for displaying menu data to be displayed in the screen display area;

comparison means for comparing the total display width with an area width of the screen display area; and display control means that, when new menu data at another hierarchical level are to be displayed in addition to menu data at at least one hierarchical level already displayed, detects the total display width of the menu data to be displayed including the new menu data, and if the detected total display width is larger than the area width of the screen display area, carries out a replacement process for replacing a plurality of items of the menu data at one of the at least one hierarchical level already displayed, with other menu data set to the one of the hierarchical levels, and then displays the resulting menu data in the screen display area.

16. A computer-readable storage medium storing a program for executing an image display for an image display apparatus, for displaying menu data set to each of a plurality of hierarchical levels of menus in a screen display area;

the program comprising:

a menu data-setting module for setting a plurality of items of the menu data to at least one hierarchical level;

an individual display width-detecting module for detecting a display width of each item of the menu data;

a total display width-detecting module for detecting, when new menu data at another hierarchical level are to be displayed in addition to menu data at least one hierarchical level already displayed, a total display width required for displaying the menu data to be displayed including the new menu data;

a comparison module for comparing the total display width with an area width of the screen display area;

a replacement process module for carrying out a replacement process for replacing a plurality of items of the menu data at one of the at least one hierarchical level already displayed, with other menu data set to the one of the hierarchical levels, if the detected total display width is larger than the area width of the screen display area; and a display module for displaying the menu data in the screen display area.

17. A computer-readable storage medium according to claim 16, wherein the replacement process module repeatedly carries out at each hierarchical level until the total display width becomes smaller than the area width of the screen display area.

18. A computer-readable storage medium according to claim 17, wherein the program further includes a storage module for carrying out, at each of a plurality of hierarchical levels already displayed, a process for storing a value of the total display width and a combination of items of the menu data at the plurality of hierarchical levels already displayed, whenever the total display width has become smaller than the area width of the screen display area through the replacement process, and an extraction module for extracting one of stored combinations of the items of the menu data that has the maximum value of the total display width, and wherein the display module displays the menu data includes displaying the new menu data at the another hierarchical level together with the menu data at respective hierarchical levels in the combination extracted by the step of extracting the one combination, in the screen display area.

19. A computer-readable storage medium according to any one of claims 16 to 18, wherein the menu data comprises image data.

20. A computer-readable storage medium according to any one of claims 16 to 18, wherein the menu data comprises at least one character code, wherein the display module converts the character code to image data by using menu display font data, and displays the image data as a menu.

21. A computer-readable storage medium according to claim 20, wherein the image display apparatus has a WWW browser function, and wherein the program uses the font data of the WWW browser as the menu display font data.

22. A computer-readable storage medium according to any one of claims 16 to 18, wherein the program includes an input-responsive control module for controlling the displaying of the menus in response to an instruction input from outside of the image display apparatus.

* * * * *